(12) United States Patent
Koitabashi et al.

(10) Patent No.: US 6,557,991 B2
(45) Date of Patent: May 6, 2003

(54) INK JET RECORDING APPARATUS AND PRINTING METHOD THEREOF

(75) Inventors: Noribumi Koitabashi, Kanagawa (JP); Hitoshi Tsuboi, Tokyo (JP); Yasunori Fujimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/884,146

(22) Filed: Jun. 20, 2001

(65) Prior Publication Data

US 2002/0044187 A1 Apr. 18, 2002

(30) Foreign Application Priority Data

Jun. 21, 2000 (JP) ........................................ 2000-187016

(51) Int. Cl.$^7$ ................................................. B41J 2/01
(52) U.S. Cl. ..................................... 347/101; 347/100
(58) Field of Search ............................... 347/100, 101, 347/98, 96; 106/31.43, 31.13, 31.6, 31.28

(56) References Cited

U.S. PATENT DOCUMENTS

| 5,618,338 | A | * | 4/1997 | Kurabayashi et al. | ........ | 347/100 |
| 5,938,827 | A | * | 8/1999 | Breton et al. | ............ | 106/31.43 |
| 6,074,052 | A |   | 6/2000 | Inui et al. | ..................... | 347/101 |
| 6,084,619 | A | * | 7/2000 | Takemoto et al. | .......... | 347/100 |
| 6,145,978 | A |   | 11/2000 | Kato et al. | .................. | 347/101 |
| 6,247,808 | B1 | * | 6/2001 | Ma et al. | ..................... | 347/100 |
| 6,367,923 | B1 |   | 4/2002 | Koitabashi | ................... | 347/101 |
| 6,387,168 | B1 |   | 5/2002 | Koitabashi et al. | ........ | 106/31.6 |

FOREIGN PATENT DOCUMENTS

| CA | 2244658 | | 2/1999 | | |
| EP | 0 847 872 A1 | | 6/1998 | | |
| EP | 0879857 | * | 11/1998 | ............... | B41J/2/01 |
| EP | 0 896 037 A2 | | 2/1999 | | |
| EP | 0 925 919 A2 | | 6/1999 | | |
| EP | 0925919 | * | 6/1999 | ............... | B41J/2/01 |

OTHER PUBLICATIONS

U.S. patent application Ser. No. 09/219,895, filed De. 24, 1998, pending.
U.S. patent application Ser. No. 09/217,940, filed Dec. 22, 1998, pending.
U.S. patent application Ser. No. 09/468,117, filed Dec. 21, 1999, pending.
U.S. patent application Ser. No. 09/470,221, filed Dec. 22, 1999, pending.
U.S. patent application Ser, No. 09/610,913, filed Jul. 5, 2000, pending.
U.S. patent application Ser. No. 09/468,839, filed Dec. 22, 1999, pending.
U.S. patent application Ser, No. 09/801,757, filed Mar. 9, 2001, pending.
U.S. patent application Ser. No. 09/883,320, filed Jun. 19, 2001, pending.
U.S. patent application Ser. No. 09/599,953, filed Jun. 23, 2000, pending.
Y.S. patent application Ser. No. 09/469,304, filed Dec. 22, 1999, pending.

* cited by examiner

Primary Examiner—John Barlow
Assistant Examiner—Manish S. Shah
(74) Attorney, Agent, or Firm—Fitzpatrick, Cella, Harper & Scinto

(57) ABSTRACT

An ink jet printing apparatus and an ink jet printing method for obtaining higher-quality printing with a pigment ink and a treating liquid, characterized in that the ink jet printing apparatus includes an ink ejection portion, a treating liquid ejection portion, and a control device for controlling the above ink ejection portion and the above treating liquid ejection portion so as to provide the treating liquid onto the printing medium only after the ink was provided thereon, and the control device controls in such a manner that the application of the treating liquid is carried out during in the recording operation.

53 Claims, 8 Drawing Sheets

INK JET RECORDING APPARATUS AND PRINTING METHOD THEREOF

BACKGROUND OF THE INVENTION

1. Field of the Invention

The present invention relates to an ink jet printing apparatus and a printing method. In particular, the present invention relates to an ink jet printing apparatus and a printing method which print characters, images, etc. on printing media, such as printing paper and OHP paper, using an ink and a liquid (hereinafter referred to as a treating liquid) that insolubilizes the coloring material in the ink.

2. Related Background Art

The ink-jet printing method has various advantages including low noise operation, low running cost, high-speed printing, and easy adaptation for down-sizing and for color printing. Thus, ink-jet printing is widely employed for printers, copying machines, or the like. In general, the ink employed for printers is selected in consideration of its printing properties such as ejecting properties and fixing properties and print qualities such as bleeding, optical reflection density, and coloring of the printed images.

As is well known, inks are divided into two types according to the coloring material contained in the ink, i.e., the dye ink and the pigment ink. The pigment ink has various advantages in comparison with the dye ink, such as superior water resistance and light fastness, and clear character printing.

The pigment in a pigment ink is generally stably dispersed in the ink by the electric repulsion force of the polymer dispersant which destroys the agglomeration of the pigment particles due to intermolecular force. Therefore, it is preferable to add a polymer dispersant to an ink in an amount according to the amount of the pigment.

When such a pigment-based ink is applied onto a recording medium such as plain paper by an ink-jet recording process for printing characters, the solvent, e.g. water, of the ink penetrates into the paper and evaporates into the ambient air, and the pigment particles agglomerate. At that time, the more a polymer dispersant is added, the stronger the agglomeration force of the ink on the paper becomes. Thus, when an ink dot is formed on a paper sheet with a prescribed volume of the ink ejected from an ink-jet head, the diameter of the dot is small and the dot shape remains irregular due to the impact of landing on the paper. Therefore, in order to obtain an ink dot having a sufficient recording density and a diameter necessary for forming a recording image without white stripes or other similar defects, the ejection volume of an ink from an ink jet head must be adjusted rather high. Even with such an adjustment, the presence of a polymer dispersant in a pigment ink, in combination with the penetrability decrease of the ink due to the strong agglomeration force of the pigment particles adsorbed on the dispersant, may delay the fixation of a pigment ink on a recording medium or lower the rub-off resistance of the recorded image.

In order to make the dot diameter larger and to improve the fixation properties, a penetrant may be added to a pigment ink to enhance penetration of the ink into a recording medium. However, use of a penetrant may cause undesirable phenomena such as the irregular peripheral shape of the dot (feathering), and penetration of the ink to the back of the recording medium (back-through), which are undesirable for the high quality recorded image. Further, since the coloring material penetrates into the recording medium, it often occurs that the optical density (OD) of the ink dot is not so much increased as the dot diameter increases.

To solve such problems, inks containing a self-dispersing pigment have been proposed. Such an ink can provide dots of a larger diameter, since the pigment agglomeration force on the paper is weaker than that in conventional pigment inks in which the pigment is dispersed by a dispersant. It, however, is not sufficient yet.

As mentioned above, there are still much room for study and development in ink and printing method to satisfy various factors determining the quality of printing such as fixability of the ink, enlargement of the ink dot diameter, uniform density in an ink dot and high optical density of the ink itself.

On the other hand, in order to further improve the quality of printed characters and images, for example, to improve water fastness and optical density (OD) of the print, there has been proposed and practiced an ink jet printing method of providing an ink and a treating liquid reactive with the ink onto a printing medium to react them thereon.

SUMMARY OF THE INVENTION

In order to solve the above-mentioned problems of the pigment ink while maintaining the advantages of the pigment ink, the inventors of the present invention have been studying the above-mentioned ink-jet printing technology using a pigment-based ink and a treating liquid which breaks the dispersion state of the pigment in the ink by reaction. As a part of the study, the inventors have carried out a recording process, in which a pigment ink and a treating liquid are applied in this order or at the substantially same time onto the recording medium so as to be mixed each other in a liquid state. The quality of the resultant image was not necessarily satisfactory and in some cases the quality was rather inferior to that formed using the pigment ink only. Specifically, when a pigment ink containing a pigment dispersed in an aqueous medium by a polymer dispersant was used in combination with a treating liquid reactive with the pigment ink, sometimes OD reduction due to the low area factor of the obtained ink dot was observed. The reason why such a phenomenon occurs is not clear, but probably because the agglomeration of the pigment of the ink on the recording medium is promoted to a large extent by the treating liquid. Thus, to increase the optical density, the area factor may be increased by increasing the amount of the ink ejection, but sometimes leading to the inferior fixability.

Also, when a combination of a pigment ink containing a self-dispersing pigment and a treating liquid reactive with the ink is used, a phenomenon called "oozing" or "haze" is sometimes observed at the peripheral part of the ink dot formed on a recording medium interfering with clear dot formation. FIG. 1 is a schematic plan view of a dot (501) to which this oozing or haze phenomenon (502) has occurred. FIGS. 2A, 2B, and 2C illustrate the assumed mechanism of occurrence of this phenomenon.

When a treating liquid S is applied to a recording medium P (especially plain paper) after a pigment ink $I_p$ containing a self-dispersing pigment but not containing a polymer dispersant was applied thereon as shown in FIGS. 2A and 2B, a reaction product 9 starts to be formed. As the reaction proceeds, radial "oozing" occurs from an approximately circular dot of the reaction product as illustrated in FIG. 2C surrounding the dot with "haze". Such "oozing" or "haze" is recognized as the same as the known feathering in appearance, deteriorating the printing quality. In the combination of self-dispersion type pigment ink and a treating liquid S reactive with the pigment ink, a phenomenon 502 shown in FIG. 1, known as "bleed" or "haze", was sometimes observed in the resultant dot (refer to FIG. 1, 501) on a printing medium. FIGS. 2A, 2B and 2C are representations presumptively illustrating the mechanism of the occurrence of the above phenomenon.

When providing the treating liquid S onto the printing medium P (especially plain paper) on which the pigment ink Ip containing a self-dispersion type pigment but no macromolecular dispersant has been already provided (refer to FIG. 2A), the formation of a reaction product 503 begins (refer to FIG. 2B). And with the progress of this reaction, "bleed" of the reaction product begins to appear radially from the almost circular dot, as shown in FIG. 2C, and the dot as a whole looks as if a haze is hanging over it. This phenomenon, "bleed" or "haze", is apparently the same as the known phenomenon, feathering; therefore, it is the cause of the deterioration of printing quality.

Above described "oozing" or "haze" is assumed to be a chemical reaction or, in a micro-scale, a following phenomenon. A dispersant-free pigment ink reacts with the treating liquid at a relatively high reaction rate, so that immediately the dispersion break down of the dispersed pigment occurs to produce clusters of the reaction product. At the same time, fine particles of the reaction product are also produced, which then flows out into the recording medium with the penetrating treating liquid to cause "oozing" or "haze".

As described above, mere combination of a pigment ink and a treating liquid would cause unexpected phenomena, making it difficult to obtain high quality ink-jet recording images. The inventors has recognized the necessity of the further technical development of an ink-jet recording technology utilizing a treating liquid, overcoming the disadvantages and retaining the advantages of the pigment ink.

The present invention is achieved on the basis of newly obtained technical knowledge and findings. Objects of the present invention are to provide an ink-jet recording apparatus and an ink-jet printing method for obtaining a high quality print, using a treating liquid and a pigment ink in ink-jet printing.

According to one aspect of the present invention, there is provided an ink jet recording apparatus which comprises an ink ejection portion for providing onto a printing medium an ink containing a pigment dispersed in an aqueous medium, a treating liquid ejection portion for providing a treating liquid reactive with the ink: and control means for controlling the ink ejection portion and the treating liquid ejection portion so as to provide onto the printing medium the ink and the treating liquid in this order, wherein the ink contains an aqueous medium, a first pigment, a second pigment and a polymer dispersant, the first pigment being a self-dispersing pigment having at least one anionic group bound to the surface thereof directly or via other atomic group, the second pigment being a pigment which can be dispersed in the water-base medium with the polymer dispersant, the polymer dispersant comprising at least one of a nonionic polymer and an anionic polymer, the treating liquid contains at least one of a multivalent metal cation and a salt thereof, that aggregates at least either of the pigments contained In the ink when the treating liquid and the ink are mixed on the printing medium in a liquid state, and the control means controls the ink ejection portion and the treating liquid ejection portion so that the ink and the treating liquid are provided onto the printing medium respectively from respective ejection portions and mixed with each other in a liquid state on the printing medium.

According to another aspect of the present invention, there is provided an ink jet recording apparatus which comprises an ink ejection portion for providing onto a printing medium an ink containing a pigment dispersed in an aqueous medium, a treating liquid ejection portion for providing a treating liquid reactive with the ink; and control means for controlling the ink ejection portion and the treating liquid ejection portion so that the ink, the treating liquid and the ink are provided onto the printing medium in this order, wherein the ink contains an aqueous medium, a first pigment, a second pigment and a polymer dispersant, the first pigment being a self-dispersing pigment having at least one anionic group bound to the surface thereof directly or via other atomic group, the second pigment being a pigment which can be dispersed in the aqueous medium with the polymer dispersant, the polymer dispersant comprising at least one of a nonionic polymer and an anionic polymer, the treating liquid contains at least one of a multivalent metal cation and a salt thereof, that aggregates at least either of the pigments contained in the ink when the treating liquid and the ink are mixed on the printing medium in a liquid state, and the control means controls the ink ejection portion and the treating liquid ejection portion so that the ink and the treating liquid are provided onto the printing medium respectively from respective ejection portions and mixed with each other in a liquid state on the printing medium, and the control means further controls the ink ejection portion to mix the ink into the liquid mixture of the ink and the treating liquid.

According to a still further aspect of the present invention, there is provided an ink jet printing apparatus which comprises an ink ejection portion for providing onto a printing medium an ink containing a pigment dispersed in an aqueous medium, a treating liquid ejection portion for providing a treating liquid reactive with the ink; and control means for providing the printing medium the ink and the treating liquid in this order, wherein the ink contains an aqueous medium, a first pigment, a second pigment and a polymer dispersant, the first pigment being a self-dispersing pigment having at least one anionic group bound to the surface thereof directly or via other atomic group, the second pigment being a pigment which can be dispersed in the aqueous medium with the polymer dispersant, the polymer dispersant comprising at least one of a nonionic polymer and an anionic polymer, the treating liquid contains at least one of a multivalent metal cation and a salt thereof, that aggregates at least either of the pigments contained in the ink when the treating liquid and the ink are mixed on the printing medium in a liquid state, the ink ejection portion includes at least one pigment ink ejection portion for discharging the ink, and the control means comprises an arrangement means for arranging the pigment ink ejection portion and the treating liquid ejection portion in a predetermined position; ejection control means for controlling relative position of each ejection portion and controlling the ejection portions so as to eject the ink and the treating liquid from the respective ejection portions and mix them with each other on the printing medium.

According to a still further aspect of the present invention, there is provided an ink jet printing apparatus which comprises an ink ejection portion for providing onto a printing medium an ink containing a pigment dispersed in an aqueous medium, a treating liquid ejection portion for providing a treating liquid reactive with the ink; and control means for controlling the ink election portion and the treating liquid ejection portion so as to provide onto the printing medium the ink and the treating liquid in this order, wherein the ink contains a water-base medium, a first pigment, a second pigment and a polymer dispersant, the first pigment being a self-dispersing pigment having at least one anionic group bound to the surface thereof directly or via other atomic group, the second pigment being a pigment which can be dispersed in the aqueous medium by the use of the polymer dispersant, the polymer dispersant comprising at least a nonionic polymer and an anionic dispersant with the same polarity as that of the group bound to the surface of the first pigment, the treating liquid contains at least one multivalent metal cation selected from the group consisting of $Ca^{++}$, $Cu^{++}$, $Ni^{++}$, $Mg^{++}$, $Zn^{+++}$, $Ba^{++}$, $Al^{+++}$, $Fe^{+++}$, $Cr^{+++}$, $Co^{++}$, $Fe^{++}$, $La^{++}$, $Nd^{+++}$ and $Y^{+++}$ or the salt thereof, or both of the multivalent metal cation and the salt thereof, and the control means controls the ink ejection portion and the treating liquid ejection portion so that the ink and the treating liquid are provided onto the printing medium separately from respective ejection portions and mixed with each other in a liquid state on the printing medium.

According to a still further aspect of the present invention, there is provided an ink jet printing apparatus which comprises an ink ejection portion for providing onto a printing medium an ink containing a pigment dispersed in an aqueous medium, a treating liquid ejection portion for providing a treating liquid reactive with the ink; and control means for controlling the ink ejection portion and the treating liquid ejection portion so as to provide onto the printing medium the ink and the treating liquid in this order, wherein the ink comprises a first ink containing a self-dispersing pigment in an aqueous medium, the self-dispersing pigment having at least one anionic group attached on the surface thereof directly or via other atomic group, and a second ink containing a second pigment and a polymer dispersant, the second pigment being a pigment which can be dispersed in the water-base medium by the use of the polymer dispersant, the polymer dispersant comprising at least one of a nonionic polymer and an anionic polymer, the treating liquid contains at least one of a multivalent metal cation and a salt thereof, that aggregates at least either of the pigments contained in the ink when the treating liquid and the ink are mixed on the printing medium in a liquid state, and the control means controls the ink ejection portion and the treating liquid ejection portion so that the ink and the treating liquid are provided onto the printing medium separately from respective ejection portions and mixed with each other in a liquid state on the printing medium.

According to a still further aspect of the present invention, there is provided an ink jet printing method for forming an image on a printing medium which comprises the steps of:

(i) applying an ink on a printing medium by ink jet method; and (ii) applying a treating liquid reactive with the ink on the printing medium, wherein the ink contains a water-base medium, a first pigment, a second pigment and a polymer dispersant, the first pigment being a self-dispersing pigment having at least one anionic group bound to the surface thereof directly or via other atomic group, the second pigment being a pigment which can be dispersed in the aqueous medium with the polymer dispersant, the polymer dispersant comprising at least one of a nonionic polymer and an anionic polymer, the treating liquid contains at least one of a multivalent metal cation and a salt thereof, that aggregates at least either of the pigments contained in the ink when the treating liquid and the ink are mixed on the printing medium in the liquid state, and the step (ii) is carried out subsequently after the step (i) or substantially at the same time in such a manner that the ink and the treating liquid come to contact in a liquid state on the printing medium.

According to a still further aspect of the present invention, there is provided an ink jet printing method which comprises the steps of: applying a first ink, applying a second ink and applying a treating liquid, in such a manner that the inks and treating liquid come into contact with each other in a liquid state on a printing medium, wherein the first ink contains a self-dispersing pigment in an aqueous medium, the self-dispersing pigment being a self-dispersing pigment having at least one anionic group bound to the surface thereof directly or via other atomic group, the second ink contains a second pigment and a polymer dispersant, the second pigment being a pigment which can be dispersed in the water-base medium with the polymer dispersant, the polymer dispersant comprising at least one of a nonionic polymer and an anionic polymer, and the treating liquid contains at least one of a multivalent metal cation and a salt thereof, that aggregates at least either of the pigments contained in the ink when the treating liquid and the ink are mixed on the printing medium in a liquid state, and the treating liquid is applied to the printing medium after at least either of the first ink and the second ink is applied onto the recording medium.

By the invention according to respective embodiments as described, high quality images of high OD and high edge sharpness can be obtained and various advantages such as rub-off resistance and enhanced fixability can be obtained.

It is still not clear the reason why such advantages are obtained by providing a treating liquid containing multivalent metal ion or the salt thereof subsequently or substantially at the same time as providing ink containing first and second ink produces such effects. However, through various experiments concerning the present invention, the present inventors have confirmed the following facts. When an ink containing the above first and second pigments is provided onto a printing medium, an ink dot of a certain size is formed on the printing medium P as shown in FIG. 3A, of which size (diameter: d1) is larger than that (diameter: d2, FIG.3B) formed with a conventional pigment ink, such as an ink containing a pigment dispersed by the polymer dispersant or an ink containing a self-dispersion type pigment (d1>d2). The reason is not still clear. Presumable mechanism is as follows: The second pigment on which a macromolecular dispersant is adsorbed and the self-dispersing first pigment electrically repel each other in the ink, and the aggregation force of the pigments is weaker than that in an ink in which the pigment is dispersed by a polymer dispersant. When the latter ink is printed on a recording medium, the second pigment having a macromolecular dispersant adsorbed thereon would not diffuse rapidly in the direction perpendicular to its surface (in the longitudinal direction). The diffusion in the direction along the paper surface (in the transverse direction) is also difficult, since the polymer dispersant molecules rapidly intertwine with each other or cross-link the pigment molecules as the water content decreases due to the evaporation and penetration into the recording medium, to cause strong aggregation of pigment. On the other hand, with the ink according to the present invention, the existence of the first pigment prevents or inhibits the macromolecular intertwining or cross-linking of pigments. In addition, the repellency between the first pigment and the polymer dispersant eases the strong intermolecular force between pigment molecules. As a result, the ink is liable to diffuse in the transverse direction. The diffusion is eased but not in disorder, since it is still under the influence of pigment aggregation force.

When the treating liquid S, which contains multivalent metal ion or the salt thereof, onto an ink dot diffusing into the recording medium uniformly and widely as described above (FIGS. 2B and 2C), a reaction (ionic reaction between the pigment and the multivalent metal ion or salting-out) occurs at the interface between the ink and the treating liquid, leading the first and second pigments stably dispersed in the ink to separate out. This reaction is considered to complete within a very short time, since the height (t1) of the ink dot is lower than that (t2) of the conventional ink dot because the ink diffuses wider than the conventional ink described above. Presumably, the above mechanism reduces the fixing time and improves the fixing characteristics, and moreover, improves the edge sharpness of the ink dot in the embodiments of the present invention. It will be understood that the effects of the present invention due to such a mechanism are peculiar to the system in which the ink and the treating liquid are provided onto a printing medium in this order or substantially at the same time.

Further, use of a treating liquid having high penetrability to a printing medium in the present invention improves fixing characteristics and edge sharpness of an ink dot much more. This may be because the high penetrability of the treating liquid accelerates the penetration of the ink solvent including water, while it is reacting with the ink on the surface of the printing medium. Thus, the solvent penetrates deeper into the printing medium. In general, the penetration of the coloring material into the printing medium tends to lower the optical density, but when an ink is provided onto a printing medium before a treating liquid as in the present invention, it is rare for the pigment to penetrate into the printing medium so deep as to decrease OD. On the contrary, it has been found that the coloring material tends to remain on or near the surface of the printing medium because of the reaction with the treating liquid. As a result, OD is improved compared with the case where no treating liquid is used.

Further, higher image quality can be achieved by optimizing the species and concentration of the multivalent metal ion or the salt thereof used in the treating liquid according to the types and ratio of the first and second pigments.

In the embodiments of the present invention, it is preferable to change the application amount of the treating liquid according to the species and ratio of the first and second pigments in the ink, in order to achieve higher image quality.

Thus, it becomes possible to form images of very high quality, i.e, high OD, free from "haze" and excellent fixation, within a very short fixing period.

DETAILED DESCRIPTION OF THE PREFERRED EMBODIMENTS

Embodiment 1-1

Figure 1:
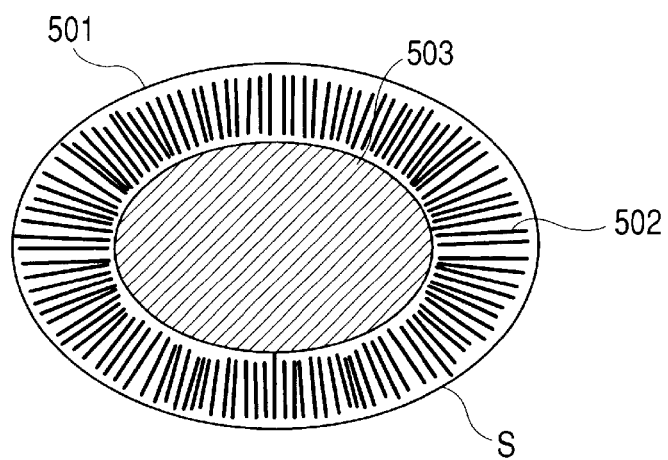
FIG. 1 is a conceptual representation presumptively illustrating the "ooze" phenomenon of the reaction product between the ink and the treating liquid.
Figures 2A, 2B, 2C:
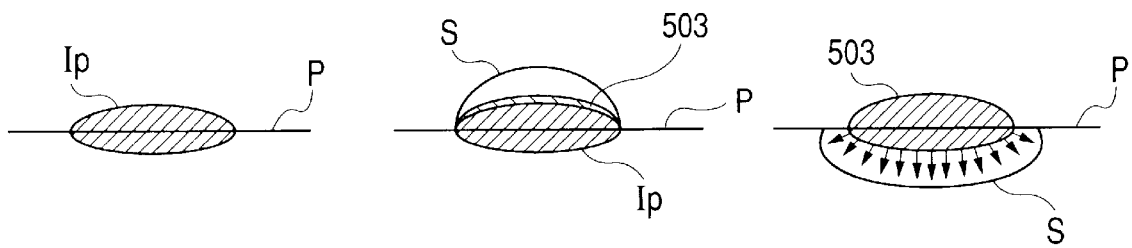
FIGS. 2A, 2B and 2C are conceptual representations presumptively illustrating the dot formation in one embodiment of the present invention in which the ink is provided onto a printing medium and then the ink is reacted with a treating liquid.
Figure 3A:
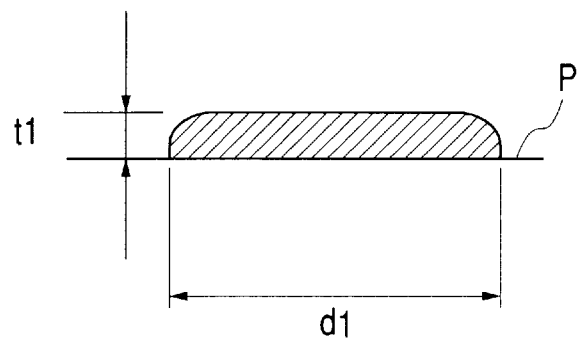
FIG. 3A schematically illustrates the state of the ink according to the present invention applied onto the surface of a printing medium and FIG. 3B illustrates the state of the conventional ink applied onto the printing medium.
Figure 3B:
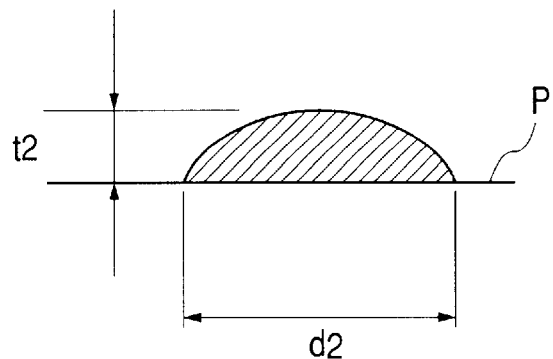

The ink jet recording method according to an embodiment of the present invention is characterized in that an ink containing a first pigment and a second pigment and a treating liquid containing a polyvalent metal cation or a salt thereof reactive with the ink are applied onto a printing medium in this order or at the substantially same time to react them in contact, resulting in image formation. Hereby, the term "reaction" means that when the ink and the treating liquid come into contact in a liquid condition on the printing medium, at least one of the first pigment and the second pigment dispersed stably in the ink aggregates to deposit. The cause of such reaction may be an ionic reaction between the anionic groups on the surface of the first pigment and the polyvalent cation (polyvalent metal cation) or a salt thereof, or salting-out of the pigment by the polyvalent cation (polyvalent metal cation) or a salt thereof.

Ink

An ink applicable to the embodiment described above includes, for example, one which contains a first and a second pigments where the first pigment is a self-dispersing pigment having at least one anionic group bonded directly or via another atomic group to the surface of the pigment the second pigment is a pigment dispersible in the aqueous medium with the aid of a polymer dispersant or nonionic polymer dispersant, and the ink contains at least one of the polymer dispersant having the same polarity as that of the first pigment or a nonionic polymer dispersant to disperse the second pigment.

The ink will be described in order.

The First Pigment

The term "self-dispersing pigment" used herein refers to a pigment which can be stably dispersed in an aqueous medium such as water, a water-soluble organic solvent and a mixture thereof without using a dispersant, not forming pigment aggregates which interfere with the normal ink ejection from the orifice in the ink-jet recording.

Anionic Self-dispersible CB

As such a pigment as described above, those having at least one anionic group bonded on their surface directly or via an atomic group are suitably used. The specific examples of such a pigment include carbon black having at least one anionic group bonded to its surface directly or via an atomic group.

The anionic groups bonded to the surface of the carbon black include, for example, —COOM, —$SO_3M$, —$PO_3HM$ and —$PO_3M_2$ (wherein M represents a hydrogen atom, alkaline metal, ammonium or organic ammonium.

The alkaline metals represented by "M" described above include, for example, lithium, sodium and potassium, and the organic ammoniums of "M" include, for example, mono-, di-, and tri-methylammonium, mono-, di-, and tri-ethylammonium and mono-, di-, and tri-methanolammonium.

Of the anionic groups described above, —COOM and —$SO_3M$ are particularly preferable because a highly stable carbon black dispersion state can be obtained.

It is preferable to use the various anionic groups described above by bonding them to the surface of carbon black via an atomic group. As such an atomic group, there are, for example, a linear or branched alkylene group having 1 to 12 carbon atoms, a substituted or unsubstituted phenylene group, or a substituted or unsubstituted naphthylene group. The substituent groups for the phenylene group or naphthylene group include, for example, a linear or branched alkyl group having 1 to 6 carbon atoms.

It is preferable to use the various anionic groups described above by bonding them to the surface of carbon black via an atomic group. As such an atomic group, there are, for example, a linear or branched alkylene group having 1 to 12 carbon atoms, a substituted or unsubstituted phenylene group, or a substituted or unsubstituted naphthylene group. The substituent groups for the phenylene group or naphthylene group include, for example, a linear or branched alkyl group having 1 to 6 carbon atoms.

It is preferable that the self-dispersing pigment particles contained in the ink according to this embodiment, at least 80% of them, are of a size of 0.05 to 0.3 μm in diameter, more preferably 0.1 to 0.25 μm.

The Second Pigment

The second pigment applicable to the ink according to this embodiment includes those dispersible by an action of a polymer dispersant in a dispersion medium of the ink, specifically, in an aqueous medium. This means that such a pigment can be stably dispersed in an aqueous medium only when the pigment particles have adsorbed the molecules of a polymer dispersant on the surface. As such pigments, there are, for example, carbon black pigments such as furnace black, lamp black, acetylene black and channel black. The specific examples of such carbon black pigments are described below, and each of the carbon black pigments can be used solely or in proper combination.

Carbon Black Pigment

Raven 7000, Raven 5750, Raven 5250, Raven 5000 ULTRA, Raven 3500, Raven 2000, Raven 1500, Raven 1250, Raven 1200, Raven 1190 ULTRA-II, Raven 1170 and Raven 1255 (available from Columbia Co., Ltd.)

Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400 and Valcan XC-72R (available from Cabot Co., Ltd.)

Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A and Special Black 4 (available from Degussa Co., Ltd.)

No. 25, No. 33, No. 40, No. 47, No. 52, No. 900, No. 2300, MCF-88, MA 600, MA 7, MA 8, MA 100 (available from Mitsubishi Chemical Industries Ltd.)

The other black pigments include, for example, fine particles of magnetic materials such as magnetite and ferrite and titanium black.

In addition to the black pigments described above, blue pigments and red pigments can also be used.

The amount of coloring materials, which is the sum of the first and the second pigments, preferably ranges from 0.1 to 15% by weight of the ink weight, more preferably 1 to 10% by weight. The ratio of the first pigment to the second pigment is preferably in the range of 5/95 to 97/3 by weight, more preferably 10/90 to 95/5 by weight. Further more preferably, the first pigment/the second pigment ratio=9/1 to 4/6. More preferably, the amount of the first pigment is larger than that of the second pigment. When the amount of the first pigment is larger than that of the second pigment, it is obtained not only the dispersion stability, but also the ejection stability including ejection efficiency and reliability attributable to the less wetting of the surface of the ink-ejecting orifice.

Further, an ink containing a lesser amount of the second pigment on which a polymer dispersant is adsorbed will spread on the surface of paper so as to presumably form a uniform thin film of the polymer dispersant on the paper, thus enhancing the rub-off resistance of the formed image.

As a polymer dispersant for uniformly dispersing the second pigment in an aqueous medium, it is suitable to use those function to disperse the pigment in an aqueous medium when adsorbed on the surface of the pigment. Such polymer dispersants include anionic, cationic and nonionic polymer dispersants.

Anionic Polymer Dispersant

Anionic polymer dispersants include, for example, polymers consisting of a hydrophilic monomer and a hydrophobic monomer, and salts of such polymers. The specific examples of hydrophilic monomers include, for example, styrene sulfonic acid, α,β-ethylenically unsaturated carboxylic acid, derivatives of α,β-ethylenically unsaturated carboxylic acid, acrylic acid, derivatives of acrylic acid, methacrylic acid, derivatives of methacrylic acid, maleic acid, derivatives of maleic acid, itaconic acid, derivatives of itaconic acid, fumaric acid and derivatives of fumaric acid.

The specific examples of hydrophobic monomers include, for example, styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkylesters of acrylic acid and alkylesters of methacrylic acid.

The specific examples of the salt used herein include, for example, alkali metal salts and onium compounds of ammonium ion, organic ammonium ion, phosphonium ion, sulfonium ion, oxonium ion, stibonium ion, stannonium ion and iodonium ion; however, the present invention is not limited to the specific examples. To the above-described polymers and the salt thereof, poly(oxyethylene) group, hydroxyl group, acrylamide, derivatives of acrylamide, (dimethylamino)ethylmethacrylate, ethoxyethyl methacrylate, butoxyethyl methacrylate, ethoxytriethylene methacrylate, methoxypolyethyleneglycol methacrylate, vinylpyrrolidone, vinylpyridine, vinyl alcohol and alkylether may be appropriately added.

Nonionic High Polymer Dispersant

Nonionic polymer dispersants, for example, poly(vinylpyrrolidone), polypropylene glycol and vinylpyrrolidone-vinyl acetate copolymer, can be used.

The above-described first and second pigments and polymer dispersants are appropriately selected in an appropriate combination, and dispersed or dissolved in an aqueous medium, so as to obtain the ink of this embodiment. When the first pigment is a self-dispersing pigment having at least one anionic group bonded onto its surface directly or via an atomic group, the use of at least one polymer dispersant selected from the group consisting of anionic polymer dispersants and nonionic polymer dispersants is preferable in view of the ink stability.

The ratio of the second pigment to the polymer dispersant used for dispersing the second pigment in an ink is preferably 5:0.5 to 5:2 by weight. The Aqueous Medium The aqueous medium to disperse the first and the second pigments in the same ink or in separate inks includes water and a mixture of water and a water-soluble organic solvent. The water-soluble organic solvents include, for example, alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; amides such as dimethylformamide and dimethylacetamide; ketones or keto alcohols such as acetone and diacetone alcohol; ethers such as tetrahydrofuran and dioxane; oxyethylene or oxypropylene copolymers such as diethylene glycol, triethylene glycol, tetraethylene glycol, dipropylene glycol, tripropylene glycol and polyethylene glycol; alkylene glycols of which the alkylene group contains 2 to 6 carbon atoms such as ethylene glycol, propylene glycol, trimethylene glycol, triethylene glycol and 1,2,6-hexanetriol; glycerol; lower alkyl ethers such as ethylene glycol monomethyl(or monoethyl) ether, diethylene glycol monomethyl(or monoethyl) ether and triethylene glycol monomethyl(or monoethyl) ether; lower dialkyl ethers of polyhydric alcohols such as triethylene glycol dimethyl(or diethyl) ether and tetraethylene glycol dimethyl(or diethyl) ether; alkanolamines such as monoethanolamine, diethanolamine and triethanolamine; sulfolane, N-methyl-2-pyrrolidone, 2-pyrrolidone, 1,3-dimethyl-2-imidazolidinone. These water-soluble organic solvents can be used singly or in combination thereof. Not particularly limited, the content of the water-soluble organic solvent is in the range of 5 to 60%, more preferably 5 to 40% by weight of the total liquid.

Ink Penetrability into the Recording Medium

When the penetrability of the ink into a recording medium is controlled by regulating the Ka value, for example, less than 1 (ml·m$^{-2}$·msec$^{-1/2}$), the ink of this embodiment containing the above described components can give, in combination with a treating liquid described later, an ink dot having an extremely uniform density and a sharp edge with an excellent fixation speed and fixation properties to the recording medium. The penetrability of the ink into a recording medium will be described below.

When the penetrability of an ink is expressed by the ink amount V per m$^2$ of a medium, the penetration amount V (ml/m$^2$=$\mu$m) of the ink into a recording medium after a predetermined time t from the ejection of an ink droplet is expressed by the Bristow equation:

$$V=Vr+Ka(t-tw)^{1/2},$$

where tw is a contact time and Vr is an amount of ink absorbed into the rough portion of the recording medium (t>tw).

Immediately after the landing of an ink droplet to the surface of the recording medium, almost all ink is absorbed in the rough portion of the recording medium (uneven surface portion of the recording medium) and nearly no ink has penetrated inside the recording medium. This period is defined as the wet time (tw) and the amount of ink absorbed in the rough portion during the wet time is defined as Vr. After the wet time, the amount of the ink (V) penetrating into the recording medium increases in proportion to ½ power of the elapsed time exceeding the wet time, i.e., (t−tw). Ka is a proportional coefficient of this increment and corresponds to the penetration rate.

The Ka value can be determined by using a test device on dynamic penetrability of liquid by the Bristow method (e.g., Dynamic Penetrability Testing Device S, trade name, a product of TOYO Seiki Mfg., Ltd.), using PB paper from Canon Inc. as a recording medium (recording paper). This PB paper is a recording paper usable in a copying machine or laser beam printer utilizing the electrophotographic process, as well as in ink-jet printing.

Similar result can be obtained when PPC paper, paper for electrophotography from Canon Inc. is used.

The Ka value changes according to the type and amount of the surfactant added. For example, addition of a nonionic surfactant, ethylene oxide-2,4,7,9-tetramethyl-5-decyen-4,7-diol (hereinafter referred to as "Acetylenol EH," a product name, Kawaken Fine Chemicals Co., Ltd.), increases the penetrability.

Inks containing no Acetylenol EH (0% Acetylenol EH content) have low penetrability, being a less penetrating ink described later. Inks containing 1% Acetylenol EH penetrate into the recording paper in a short period of time, being a highly-penetrable ink described later. Inks containing 0.35% Acetylenol EH are semi-penetrable, having properties intermediate between the above two types.

TABLE 1

| | Ka value (ml/(m$^2$ · msec$^{1/2}$) | Acetylenol content (%) | Surface tension (dyne/cm) |
|---|---|---|---|
| Less penetrating ink | <1 | 0≦ and <0.2 | ≦40 |
| Semi-penetrating ink | 1≦ and <5 | 0.2≦ and <0.7 | 35≦ and <40 |
| Highly penetrating ink | 5≦ | 0.7≦ | <35 |

Table 1 shows Ka value, Acetylenol EH content (%) and surface tension (dyne/cm) of each of "less penetrating ink", "semi-penetrating ink" and "highly-penetrating ink". As seen from the table, an ink having a larger Ka value has a higher penetrability to the recording paper. In other words, an ink having a smaller surface tension has a higher penetrability.

The Ka values shown in Table 1 were measured by Dynamic Penetrability Tester S for Liquids (by Toyo Seiki Co., Ltd.) based on the Bristow method as described above. In this experiment, the aforementioned PB paper (Canon Inc.) was used as the recording paper. Similar results were obtained with the aforementioned PPC paper (Canon Inc.).

The "highly-penetrable ink" contains Acetylenol EH 0.7% or more and shows high penetrability. The penetrability of the ink of this embodiment is preferably set to be smaller than the Ka value of "over-coating ink," that is, smaller than 1.0 (ml·m$^{-2}$·msec$^{-\frac{1}{2}}$), more preferably smaller than 0.4 (ml·m$^{-2}$·msec$^{-\frac{1}{2}}$)

Addition of Dye

Dyes may be added to the ink of this embodiment. The ink which contains the first and the second pigments as well as a dispersant for dispersing the second pigment in an aqueous medium, and a dye added thereto, in combination with a treating liquid described later, can form an ink dot of higher quality on a recording medium in a short fixing time. Although it has been already mentioned that the aggregating force of the second pigment is eased in the presence of the first pigment, it is also considered that the addition of a dye further eases the aggregating force of the second pigment, thereby effectively suppresses the unevenness in a printed image such as "crazing" which often occurs on a recording medium of less ink absorbency than the plain paper. Dyes applicable to the ink of this embodiment include, for example, an anionic dye and a cationic dye. Preferably the dye having the same polarity as that of the group bonded to the surface of the first pigment is used.

Anionic and Cationic Dyes

As the anionic dyes described above which are soluble in an aqueous medium and can be used in this embodiment, known acid dyes, direct dyes and reactive dyes are suitably used. As the cationic dyes, known basic dyes are suitably used. Preferably used are anionic and cationic dyes having a disazo- or triazo skeleton structure. Further, preferably two or more dyes different in the structure are used jointly. Dyes other than black dyes, such as cyan, magenta and yellow dyes, may be used as long as the tone of the ink does not change significantly.

Addition Amount of Dye

Dye may be added in an amount ranging from 5 to 60 wt % of the whole coloring material. To exploit the effect of mixing of the first and second pigments more effectively, however, the addition amount of the dye is preferably lower than 50 wt %. Further, for the inks of which the printing properties on plain paper are regarded important, the dye amount preferably ranges from 5 to 30 wt %.

Treating Liquid

Treating liquids usable in the present invention are those containing a multivalent metal cation or a salt thereof that can react with at least one pigment contained in the above described ink. Specifically, the treating liquid contains at least one multivalent metal cation selected from the group consisting Ca$^{++}$, Cu$^{++}$, Ni$^{++}$, Mg$^{++}$, Zn$^{+++}$, Ba$^{++}$, Al$^{+++}$, Fe$^{+++}$, Cr$^{+++}$, Co$^{++}$, Fe$^{++}$, La$^{++}$, Nd$^{+++}$, and Y$^{+++}$, preferably, from the group consisting of Ca$^{++}$, Cu$^{++}$, Ni$^{++}$, Mg$^{++}$, Zn$^{+++}$, Ba$^{++}$, Al$^{+++}$, Fe$^{+++}$, and Cr$^{+++}$.

Representative anions which can form a salt with these metal cations to be used in the present invention includes, for example, Cl$^-$, NO$_3^-$, I$^-$, Br$^-$, ClO$_3^-$, and CH$_3$COO$^-$, but not limited thereto.

The treating liquid containing the above described multivalent metal cation or a salt thereof to be effectively used in the present invention preferably contains a salt concentration of about 0.01 to 10%, more preferably, from 1 to 5%, further preferably from 1 to 3% by weight.

The treating liquid may include water, water-soluble organic solvents and other additives, in addition to the multivalent metal ions or salts,described above. The water-soluble organic solvents include, for example, amides such as dimethylformamide and dimethylacetamide; ketones such as acetone; ethers such as tetrahydrofuran and dioxane; polyalkylene glycols such as polyethylene glycol, polypropylene glycol; alkylene glycols such as ethylene glycol, propylene glycol, butylene glycol, triethylene glycol, 1,2,6-hexanetriol, thiodiglycol, hexylene glycol and diethylene glycol; lower alkyl ethers of polyhydric alcohols such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; in addition, glycerol, N-methyl-2-pyrrolidone, 1,3-dimethylimidazolidinone, triethanolamine, sulfolane, dimethyl sulfoxide. The above water-soluble organic solvents are not restricted to any fixed content; however, the content preferably ranges from 5 to 60 wt % of the whole liquid, more preferably 5 to 40 wt %.

In this embodiment, the above-described treating liquid is preferably prepared to have a high penetrability to the recording medium to enhance the fixation rate or to improve the fixation properties of the ink dot to the recording medium.

The application amount of the treating liquid to the printing medium is preferably equal to or lower than that of the ink. As described later, the amount is preferably smaller than 50% of the amount of the BK ink applied and particularly preferably 30% or smaller, to achieve higher optical density.

The treating liquid may contain any coloring material. The coloring material may be one containing at least one of cyan, magenta, and yellow dyes, but not limited thereto. For example, at least one color ink other than the black ink may contain the component of the treating liquid, which dispenses with the application of the colorless treating liquid. When one considers the function of the treating liquid, i.e., at least one of a polyvalent metal cation and a salt thereof contained in the liquid instabilizes the dispersibility of the pigment contained in the ink used together with the treating liquid in recording, the coloring material to be added into the treating liquid is preferably a coloring material that does not react with the polyvalent metal cation or the salt thereof keeping its solubility. Examples of such coloring materials include C.I. Acid Yellow 23; C.I. Acid Red 52, 289; C.I. Acid Blue 9; C.I. Acid; C.I. Reactive Red 180: C.I. Direct Blue 189, 199; C.I. Basic Yellow 1, 2, 11, 13, 14, 19, 21, 25, 32, 33, 36, and 51; C.I. Basic Orange 2, 15, 21, 22; C.I. Basic Red 1, 2, 9, 12, 13, 37, 38, 39, and 92; C.I. Basic Violet 1, 3, 7, 10, and 14; C.I. Basic Blue 1, 3, 5, 7, 9, 19, 24, 25, 26, 28, 29, 45, 54, and 65; C.I. Basic Green 1 and 4; C.I. Basic Brown 1 and 12; C.I. Basic Black 2 and 8: as well as a magenta dye represented by the following structural formula (I). These aqueous dyes may be used singly or in a combination of 2 or more species. In addition, the concentration of these aqueous dyes is preferably in the range of, for example, from 0.1 to 20% by weight of the total amount of the treating liquid.

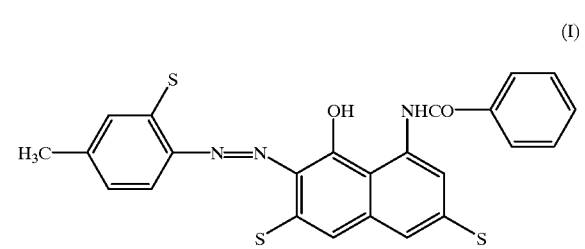

(I)

where "S" represents —SO$_3$X (where, X is an alkali metal and the like).

It is preferable that the penetration rate of the treating liquid is 5.0 (ml/(m$^2 \cdot$msec$^{1/2}$)) of Ka value or higher, measured by the Bristow method.

Basically, as described above, the above-described effect of the present invention can be obtained when the ink and the treating liquid are applied in this order. However, even when the ink and the treating liquid are applied substantially at the same time so long as the treating liquid does not land before the ink, the same effect can be obtained. Thus, this case is also included in the scope of the present invention.

How to realize this application order of the ink and the treating liquid is determined by an actual constitution. For example, when a serial type head is used, the above-described order can be realized by multiple scanning operations to the same region with the intervenient paper conveying action. Such a case is also embraced by the present invention.

As described above, the ink of the present invention is provided to a recording medium after the liquid treatment. The number of the ink droplets is not necessarily limited to one.

For example, the ink may be provided in the form of two droplets before the treating liquid is applied. In this case, preferably the ink droplet provided earlier contains the second pigment at a content higher than that of the first pigment, while the ink droplet provided later contains the first pigment at a content higher than that of the second pigment. By this, in the reaction with the later provide treating liquid, the second pigment tends to react with the treating liquid, which further inhibits the oozing of the first pigment. As an embodiment to achieve the same effect, three ink droplets may be applied prior to the treating liquid, where the later the ink to be applied, the higher the first pigment content.

In cases where the ink is provided in the form of multiple droplets as described above, the total amount of the provided ink droplets is set to be almost the same the ink droplet when the ink is provided in one droplet. In other words, according to the embodiment of the present invention, even if the ink is provided in multiple droplets and the amount of each droplet decreases according to the number of the droplets, the above-described desired results can be obtained.

In this embodiment, as long as the above desired results can be obtained, the time interval between the treating liquid application and the ink application does not matter. Any time interval, as long as it brings the above desired results, is embraced by the present invention.

In other words, the reaction of the mixed ink and the treating liquid occurs in various forms depending on the time from the treating liquid application to the ink application. It has been observed that, for example, even when the above time lag is short, the pigments etc. and the treating liquid are sufficiently mixed in the peripheral region or the edge portion of a dot formed by the overlapped treating liquid and ink, at least suppressing "haze".

In the present specification, "mixing" of the ink with the treating liquid means not only total mixing, but also partial mixing, for example, in the edge portion. In addition, mixing includes mixing in the recording medium after the ink penetration. All mixing modes are described "mixing in a liquid state."

The color tone (type), density and number of the ink provided to a recording medium in this embodiment can be combined in a desired manner, as long as the ink is provided according to the order described above. The ink types commonly used include, for example, black (Bk), yellow (Y), magenta (M) and cyan (C). For each color, inks of two density grade can be used. More specifically, at least one ink may be selected from an yellow ink, a magenta ink and a cyan ink as the ink of the first embodiment containing the first and the second pigment to be applied after the treating liquid to a recording medium.

Of the combinations to which the present invention is applicable, the most preferable is a case where the ink of this embodiment is a black ink, because the effect of this embodiment such as increase in OD value and suppression of "haze" can most effectively contribute to the quality of printed characters.

To apply the ink and the treating liquid to a recording medium, there are various methods, for example, coating of the medium, direct contact with the medium, and so on. All those processes are embraced in the present invention; however, the most preferable one is an ink-jet process utilizing print heads. In this process, the combination and arrangement of print heads, as ink-ejecting portions, can be determined according to the order of providing the ink as well as the combination of ink types including the treating liquid, described above.

To be specific, the order of providing an ink and a treating liquid, described above, is made possible by such a constitution that the print heads for the ink and the treating liquid are arranged in the direction in which the print heads travel relative to a recording medium.

To be more specific, the method of providing ink and a treating liquid according to the present invention described above is made possible by any of the following types print head: so called "full multi-type print head" in which ink-ejecting ports are arranged in the range corresponding to the entire width of the printing area of the recording medium, and is called "serial-type print head" which travels on a recording medium for scanning.

As the ink ejecting method of these print heads, any known methods, such as the piezo ink-jet method, can be adopted. However, the most preferable method is such that a bubble is generated in the ink or treating liquid utilizing heat energy and the ink or treating liquid is ejected by the pressure of the bubble.

Usually, the areas to which the droplets of the ink and the treating liquid ejected from the print heads are controlled to be one pixel unit to form the print image, so that the areas precisely overlap. The application of the present invention is, however, not limited to this constitution. The present invention also includes such constitution that partial overlapping of the ink dot and the treating liquid dot to provide the effect of this embodiment, and such constitution that the treating liquid is not provided to all pixels but intermittently provided so that the treating liquid flowing in from the adjoining pixel by bleeding reacts with the pigment etc.

Embodiment 1-2

Another embodiment of the present invention will be described below.

This embodiment aims at further rapid ink fixation by increasing the penetrability of the treating liquid.

The rapid ink fixation is a significant factor for high speed printing or enhancing throughput. The throughput can be directly enhanced by increasing the drive frequency of the print heads and the recording medium conveyance speed. However, if the ink on a recording medium is not fixed yet even after the output of the printed recording medium, handling of such a medium is not easy, and another recording medium may be stained by the ink in a construction where the output recording media are piled up.

Of various factors contributing to the enhancement of printing speed, first comes the output speed of the printed recording medium. which depends on the conveyance speed of a recording medium or the scanning speed of the print heads. That is, in an apparatus using the full multi-type print heads, the conveyance speed of a recording medium in printing operation is directly related to the output speed of the printed recording medium, while in an apparatus using the serial type-print heads, the scanning speed of the heads is related to the output speed of the printed recording medium in the end. The conveying speed of a recording medium correlates with the ink-ejection frequency for one pixel and the print resolution, i.e., dot density. Specifically, in a construction where a single pixel is printed with ink droplets ejected from multiple print heads, if the print resolution is fixed, the ejecting frequency per pixel correlates with the above-described conveyance speed.

On the other hand, when the technical problems related to the reaction between the above described pigment ink and the treating liquid are considered, it is preferable that the time interval between the ink ejection and the treating liquid ejection is as long as possible, because the problematic phenomena tend not to occur when the ink can diffuse into the printing medium before the reaction. In other words, the above described problems in printing with the pigment ink and the treating liquid also inhibit the enhancement of printing speed. Particularly, when a pigment ink having a small penetration rate to increase the OD value, this problem becomes an eminent obstacle in increasing printing speed.

Figure 4:
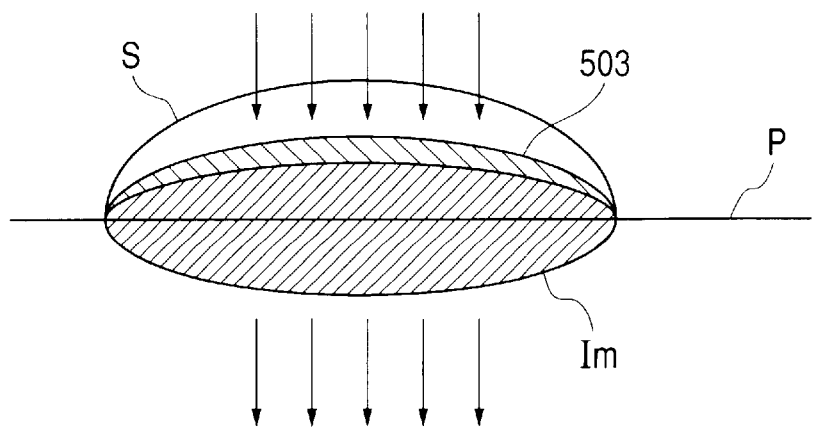
FIG. 4 is a conceptual representation presumptively illustrating the dot formation in one embodiment of the present invention in which a pigment ink and a dye ink are mixed on a printing medium and then the mixed inks are reacted with a treating liquid.

In this embodiment, a treating liquid of high penetration speed is used to increase the penetration speed of the ink even if the ink is of a relatively slow penetrating speed, in addition to achieve the effects explained in the above embodiment 1. Namely, the penetrating speed of the ink (v1) and that of the treating liquid (v2) into the printing medium satisfy the relation v1<v2. FIG. 4 illustrates this phenomenon.

FIG. 4 shows a case where an ink Im and a treating liquid S are applied to the printing medium P in this order. In this case, a reaction product 503 first appears in the boundary region where the treating liquid S and the ink Im contact. The penetrating speed of a mixture of the treating liquid S and the ink Im becomes faster than the ink alone. Thus, the increased penetrating speed, as a whole, allows high speed fixing.

This embodiment enables relatively high speed fixation by using a treating liquid of a high penetration speed, even when an ink of relatively low penetrability is used to improve OD value.

Embodiment 1-3

Still another embodiment of the present invention relates to the application order of the ink and the treating liquid. Namely, in this embodiment, the ink is applied before and after the application of the treating liquid.

According to this embodiment, the OD value and suppression of haze are particularly improved among the above described effects of the invention. In addition, when the treating liquid is of a high penetrability, better fixability can be realized.

The above described advantageous effects of this embodiment are attributable to the small fluidization, that is, the ink amount in the reaction between the first applied ink and the treating liquid is relatively small, making fluidization small, and when the ink is applied after the treating liquid, fluidization is not much increased since the viscosity has increased due to the first reaction to a certain degree, and the ink penetration is already proceeding.

Application Amount of the Treating Liquid

Preferably, the treating liquid should be applied in an amount equal to or smaller than the ink amount. As shown in Examples below, when the applied amount is smaller than that of the ink, a higher OD value can be obtained with higher printing quality. More preferably, the application amount of the treating liquid is 25% of that of the Bk ink or less, particularly preferably, 20% or less.

Embodiment 2

In the first embodiment described above, the same ink contains the first and second pigments. It is also within the scope of the present invention that the first and second pigments are contained in different inks.

Embodiment 2-1

In this embodiment, a first ink containing a first pigment, a second ink containing a second pigment and a treating liquid that reacts with both the first and second inks are applied to a printing medium in such a manner that they contact each other in a liquid state. At that time, at least one of the first and second inks is applied thereto prior to the application of the treating liquid. Various advantageous effects of the present invention are achieved by this embodiment.

There are the following four application orders:

(1) First ink→Second ink→Treating liquid (2) Second ink→First ink→Treating liquid (3) First ink→Treating liquid→Second ink (4) Second ink→Treating liquid→First ink Embodiment 3

In this embodiment, the ink containing the first and second pigments is a black ink (Bk), and at least one of the other color inks, those provided to a printing apparatus such as cyan (C), magenta (M) and yellow (Y), contains the component of the treating liquid. In this embodiment, each color ink having the treating liquid composition is applied in an amount. preferably less than the application amount of the black ink, e.g., 25% or less, and more preferably 20% or less of the application amount of the black ink.

EXAMPLES

Examples of the present invention will be described in detail with reference to the drawings. It is to be understood that the present invention is not limited to these specific examples, and that it is capable of covering other examples such as the combinations thereof and of being applied to other technical fields involved in the similar problems.

Example 1-1

Figure 5:
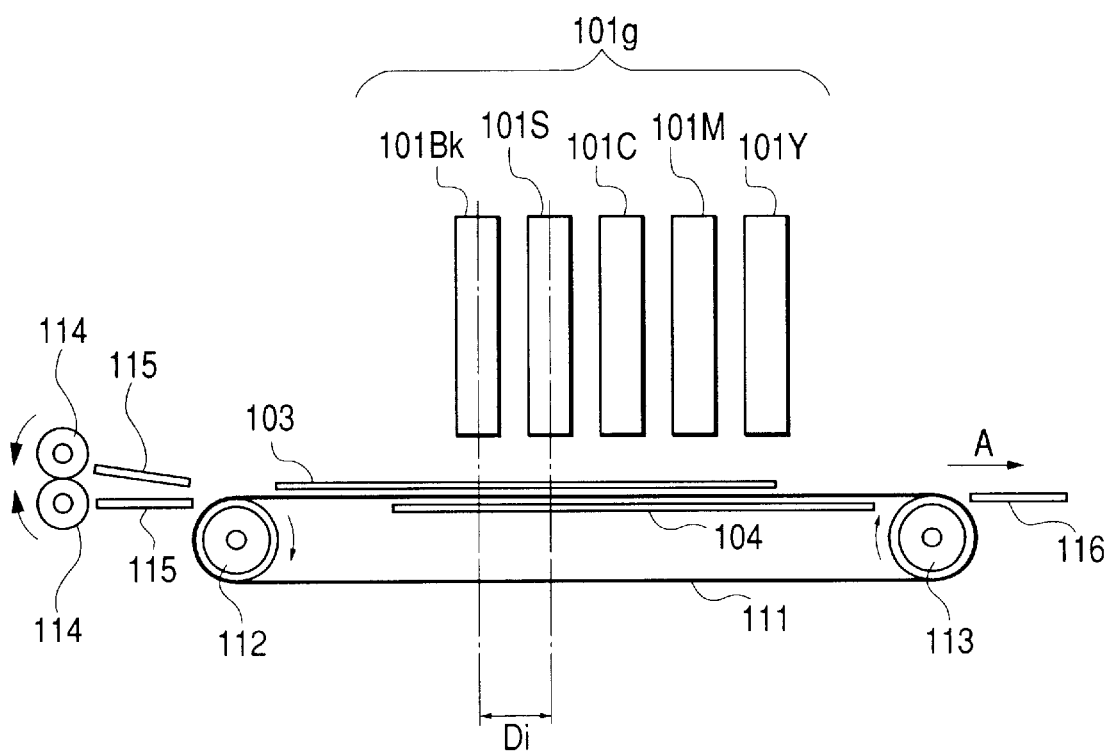
FIG. 5 is a side view of a printing apparatus in accordance with one embodiment of the present invention, showing the rough configuration thereof.

FIG. 5 is a side view schematically illustrating a full line type printing apparatus according to the first example of the present invention.

This printing apparatus 1 adopts an ink-jet printing method in which printing is carried out by ejecting an ink or a treating liquid from multiple full line type print heads (ejecting portions) arranged in prescribed positions toward the direction in which a recording medium as a recording medium is conveyed (in the direction shown by the arrow A in the figure). It operates under control of a control circuit (not shown).

Each print head 101Bk1, 101Bk2, 101S, 101C, 101M and 101Y of a head group 101g has about 7200 ink-ejecting ports arranged in the transverse direction of a recording paper 103 (in the direction perpendicular to the sheet showing the figure) conveyed in the direction shown by the arrow A in the figure. The printing apparatus can perform printing on a recording paper to a maximum size of A3.

The recording paper 103 is conveyed in the direction A with the aid of rotation of a pair of resist rollers 114 which is driven by a conveyance motor, guided by a pair of guide plates 115 so as to register its tips, and conveyed by a conveyance belt 111. The conveyance belt 111 which is an endless belt is held by two rollers 112 and 113, and the displacement in vertical direction of its upper side portion is regulated by a platen 104. When the roller 113 is rotationally driven, the recording paper is conveyed. The recording paper 113 is held to the conveyance belt 111 by electrostatic holding. The roller 113 is rotationally driven by a driving source, such as a motor, not shown in the figure in such a direction that the recording paper 103 is conveyed in the direction shown by the arrow A. The recording paper 103 having been subjected to recording while being conveyed on the conveyance belt 111 is delivered onto a stocker 116.

Print heads of a recording head group 101g consisting of two heads 101Bk1 and 101Bk2 for ejecting a black ink, a head 101S for ejecting a treating liquid and heads for ejecting color inks (a cyan head 101C, a magenta head 101M and an yellow head 101Y), described in the above embodiment 1, are arranged in the direction A in which the recording paper 103 is conveyed. Print of black letters and color images are made possible by ejecting each colored ink and the treating liquid from each print head.

In this embodiment, an ink with a low penetrating speed (hereinafter referred to as a less penetrating ink) was used as the black ink ejected from the head 101Bk, and as the treating liquid and the cyan, magenta and yellow inks, those having a high penetration speed were used (hereinafter referred to as highly-penetrating treating liquid and inks).

The composition of the treating liquid and each ink used in this embodiment are as follows. The ratio of each ingredient is shown in part by weight. Total of each component makes 100 parts in Tables 2 to 7, and 9 to 19. Acetylenol EH is a product of Kawaken Fine Chemicals Co., Ltd.

TABLE 2

(Treating liquid)

| | |
|---|---|
| Glycerol | 7 parts |
| Diethylene glycol | 5 parts |
| Acetylenol EH | 2 parts |
| Magnesium nitrate | 2 parts |
| Water | Balance |

TABLE 3

(Yellow (Y) ink)

| | |
|---|---|
| C.I. Direct Yellow 86 | 3 parts |
| Glycerol | 5 parts |
| Diethylene glycol | 5 parts |
| Acetylenol EH | 1 part |
| Water | Balance |

TABLE 4

(Magenta (M) ink)

| | |
|---|---|
| C.I. Acid Red 289 | 3 parts |
| Glycerol | 5 parts |
| Diethylene glycol | 5 parts |
| Acetylenol EH | 1 part |
| Water | Balance |

TABLE 5

(Cyan (C) ink)

| | |
|---|---|
| C.I. Direct Blue 199 | 3 parts |
| Glycerol | 5 parts |
| Diethylene glycol | 5 parts |
| Acetylenol EH | 1 part |
| Water | Balance |

TABLE 6

(Black (Bk) ink)

| | |
|---|---|
| Pigment dispersion 1 | 25 parts |
| Pigment dispersion 2 | 25 parts |
| Glycerol | 6 parts |
| Diethylene glycol | 5 parts |
| Acetylenol EH | 0.1 part |
| Water | Balance |

Ka value of this black ink was 0.33 $(ml/m^2 \cdot msec^{1/2})$. The pigment dispersions 1 and 2 were prepared as follows:

Pigment Dispersion 1

Ten grams of carbon black with a surface area of 230 $m^2/g$ and a DBP oil absorption of 70 ml/100 g and 3.41 g of p-aminobenzoic acid were fully mixed in 72 g of water, then 1.62 g of nitric acid was added dropwise and stirred at 70° C. After several minutes, a solution of 1.07 g of sodium nitrite in 5 g of water was added and stirred for additional 1 hour. The slurry obtained in this manner was filtered with Toyo filter paper No. 2 (from Advantist Co., Ltd.), and its pigment particles were fully water-washed, followed by the drying in an oven at 90° C. Then water was added the pigment to prepare 10 wt % pigment aqueous solution. Thus, obtained was a pigment dispersion in which an anionically charged self-dispersing carbon black having a hydrophilic group bonded onto its surface via a phenyl group, as shown by the following formula, was dispersed.

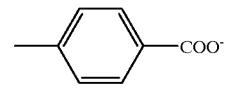

Pigment Dispersion 2

The pigment dispersion 2 was prepared as follows. 14 parts of styrene-acrylic acid-ethyl acrylate copolymer (acid value of 180, average molecular weight of 12000), as a dispersant, 4 parts of monoethanolamine and 72 parts of water were mixed. And the mixture was heated to 70° C. in a water bath to completely dissolve the resin content. Resin cannot sometimes be completely dissolved if its content is low. Accordingly, when intending to dissolve resin, a solution with a desired resin content may be prepared by diluting the solution with a high resin content previously prepared. To this solution added was 10 parts of carbon black (brand name: MCF-88, pH 8.0, from Mitsubishi Chemical Industries Ltd.), which is dispersible in an aqueous solution only with the aid of the action of a dispersant, and the solution was subjected to premixing for 30 minutes. Then the following operation was carried out to obtain the pigment dispersion 2 in which the carbon black (MCF-88) was dispersed in an aqueous medium with the aid of a dispersant.

Disperser: Side Grinder (Igarashi Machine Industry Co., Ltd.)

Grinding medium: zirconia beads with a 1 mm diameter

Packing of grinding medium: 50% (by volume)

Grinding duration; 3 hours

Centrifuging (12000 RPM, 20 minutes)

In this example, ink-ejecting ports of each print head were arranged at a density of 600 dpi, and printing was carried out at a dot density of 600 dpi in a direction of the conveyance of the recording paper. Accordingly, the dot density of a printed image in this example is 600 dpi in both row and column. The ejecting frequency of each head was 4 KHz, accordingly the conveyance speed of recording paper is about 170 mm/sec. The distance Di between the head 101Bk1 for ejecting a mixed ink and the head 101S for ejecting a treating liquid (see FIG. 6) is 40 mm, accordingly the time interval from the ejection of the black ink to the ejection of the treating liquid is about 0.24 sec.

The ejecting amount of each print head was 15 pl (picoliter) per ejection. When additional experiments were carried out in which the time interval from the ejection of the black ink Bk to the ejection of the treating liquid S was decreased to the minimum of 0.1 sec, similar results were obtained.

Example 1-2

An experiment was carried out int the same manner as in Example 1-1 except that the amount of the treating liquid applied to the printing medium was about 25% of the applied black ink.

Example 1-3

An experiment was carried out int the same manner as in Example 1-1 except that the amount of the treating liquid applied to the printing medium was about 13% of the applied black ink.

Comparative Example

As a Comparative Example to Examples 1-1 to 1-3, an experiment was carried out in the same manner as in Example 1-1, except that the ink contains only the pigment dispersion 2 as shown in Table 7.

TABLE 7

| (Black (Bk) ink) | |
|---|---|
| Pigment dispersion 2 | 50 parts |
| Glycerol | 5 parts |
| Diethylene glycol | 8 parts |
| Isopropyl alcohol | 4 parts |
| Water | Balance |

In this example, no treating liquid was used.

Represented in Table 8 below are evaluation results of printed articles obtained in Examples 1-1 to 1-3 and Comparative Example 1.

TABLE 8

| | Example 1-1 | Example 1-2 | Example 1-3 | Comparative Example 1 |
|---|---|---|---|---|
| OD | 1.31 | 1.45 | 1.47 | 1.05 |
| Water fastness development | Within a few seconds | Within a few seconds | Within a few seconds | Approximately an hour |
| Fixability | Within a few seconds | Within a few seconds | Within a few seconds | Approximately 20 seconds |
| Feathering (haze) | A | A | A | B |
| Edge sharpness of solid portion | A | A | A | A |

In the Examples and Comparative Examples, a predetermined image was printed on PB paper (Canon Inc.) to measure the optical density of the black region. In Table 8, "OD" is the optical density measured by a Macbeth transmission reflection densitometer; "Development of Water Fastness" represents the time after printing by when the printed image becomes not to be corrupted by water dropped thereon; "Fixability" represents the time after printing by when almost no offset is observed. In "Feathering", evaluation "A" means feathering or haze was not observed around the dot image under a magnifying glass and "B" means feathering or haze were observed.

The "edge sharpness" of the solid portion was evaluated as follows: an edge portion of a solid line image was observed under a magnifying glass, and when the edge of the line formed a straight line, evaluation was "A", when the edge of the line had some damage in linearity but with no practical problem, evaluation was "B ", and when the edge of the line lost linearity, it was evaluated as "C".

Table 8 clearly shows that as the application amount of the treating liquid is reduced, higher OD is obtained in the ink and treating liquid system of the invention.

With the ink—treating liquid system of Example 1-1, where the ink contains a self-dispersing pigment and a polymer dispersant and a pigment dispersible with the dispersant, a higher OD value is obtained than Comparative Example where the ink contains only a polymer dispersant and a pigment dispersible by the dispersant.

When an additional experiment was carried out with a time interval of 0.1 sec from the ejection of the black ink Bk to the ejection of the treating liquid S, similar result was obtained.

The full multi-type printing apparatus described above is especially suitable for high-speed printing, because its print heads are used in a fixed state during the printing operation and the time required for conveying recording paper is almost the same as the time required for printing. Thus, when applying the present invention in such printing apparatus, its high-speed printing function can be further enhanced and printing of higher quality, that is, printing with a higher OD is made possible.

The printing apparatus of the present invention is generally used as a printer, but it can be used as a printing portion of copying machines, facsimiles, etc.

Although Examples shown in Table 8 were carried out using one head for the black ink, it is to be understood that the present invention is not limited to this specific example. The construction in which two heads eject the black ink with an ejection amount of about 8 pl (in total about 16 pl) can also produce the same effect.

Example 2

Figure 6:
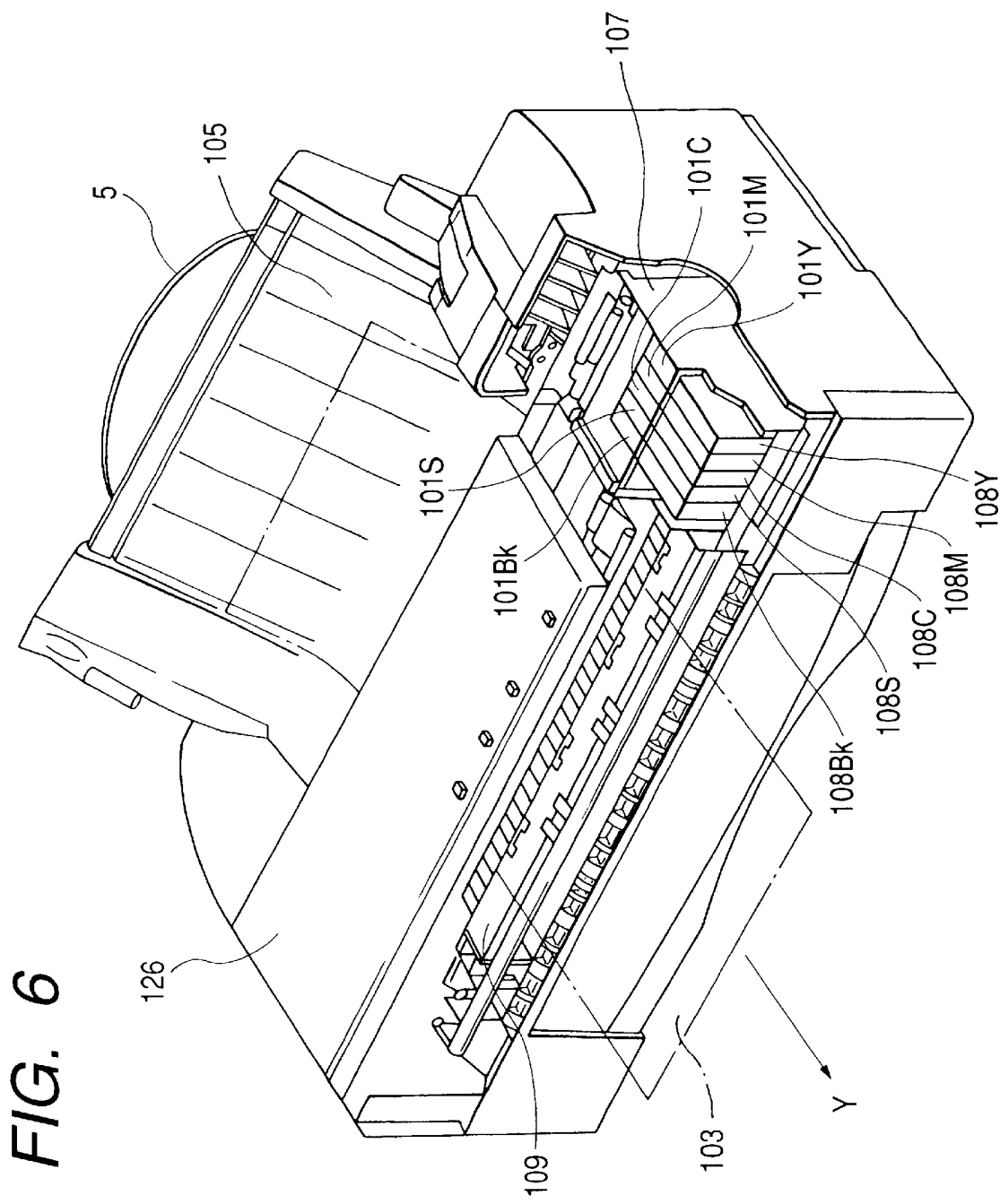
FIG. 6 is a perspective view of a printing apparatus in accordance with another embodiment of the present invention.

FIG. 6 is a schematic perspective view illustrating a construction of a serial type printing apparatus to be used in the present invention. It is apparent that not only the full line-type printing apparatus but a serial type printing apparatus can be used for applying to a recording medium a treating liquid after the application of the ink. In FIG. 6, the elements equal to those shown in FIG. 5 are denoted by the same reference numeral as in FIG. 5 and their detailed descriptions are omitted.

A recording paper 103, as a recording medium, is inserted into a paper-supplying portion 105 and delivered via a printing portion 126. In this example, plain paper which is cheap and widely used is employed as the recording medium 103. In the printing portion 126. a carriage 107 is constructed to hold print heads 101Bk, 101S, 101C, 101M and 101Y and be able to do a reciprocating motion along a guide rail 109 with the aid of driving force of a motor, which is not shown in the figure. The print head 101Bk is for ejecting a black ink described in the aforementioned embodiment. The print heads 101S, 101Bk, 101C, 101M and 101Y are for ejecting a treating liquid, cyan ink, magenta ink and yellow ink, respectively; and they are driven to eject the liquid or ink to the recording paper 103 in this above order.

Each head is fed with an ink or a treating liquid from each corresponding tank 108C, 101Bk, 108C, 108M or 108Y. When the ink is to be ejected, each electrical heat transducer, that is, according to the driving signal sent to the heater of each ejection port of each head, heat energy is applied to the ink or the treating liquid to generate a bubble. By the pressure of this bubble, the ink or the treating liquid is ejected from its head. Each head includes 64 ejection ports at a density of 360 dpi which are arranged in almost the same direction as the paper 103 conveying direction Y, in other words, in the direction almost perpendicular to the scanning direction of each head. The ejection amount of each ejection port is 25 pl.

In the above construction, the distance between the heads is ½ inch (1.27 cm), accordingly the distance between the head 101Bk and the head 101S is 1 inch(2.6 cm). The printing density is 720 dpi in the scanning direction and the ejection frequency of each head is 7.2 KHz. Accordingly, the time from the ejection of the treating liquid S from the head 101S to the ejection of the black mix ink from the head 101 Bk is 0.05 sec.

Figure 7:
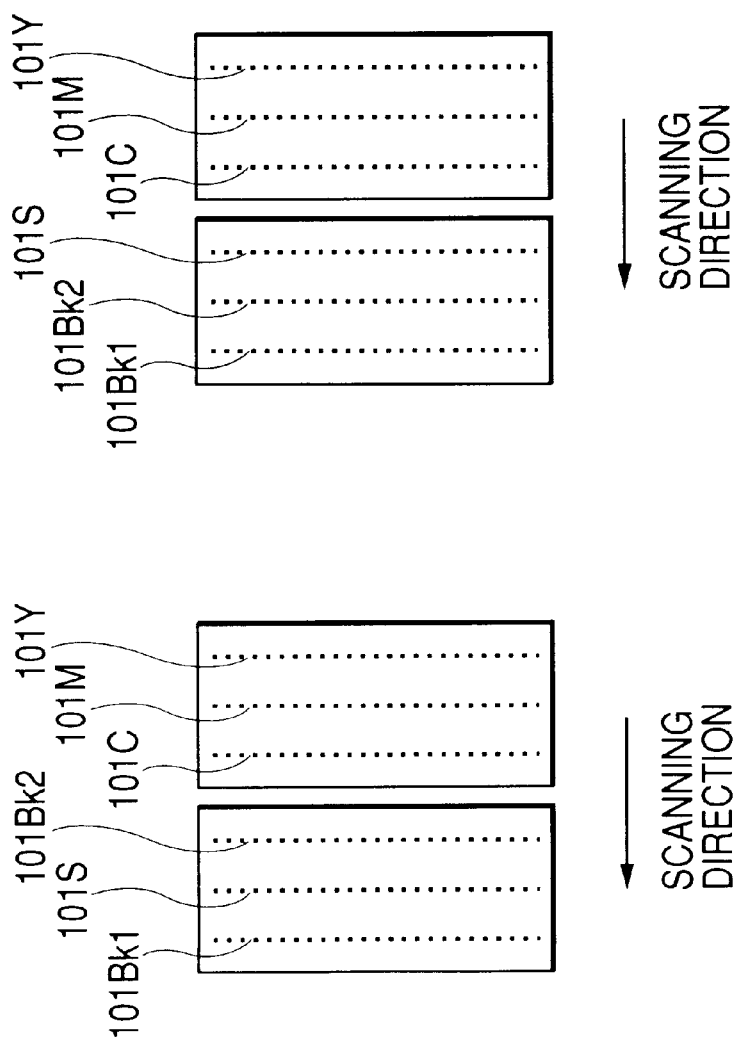
FIGS. 7A, 7B and 7C are schematic views of a head configuration of a printing apparatus in accordance with still another embodiment of the present invention.

FIGS. 7A to 7C show different examples of the head configuration of a serial type printing apparatus shown in FIG. 6, schematically showing the ejection port arrangement.

As shown in FIG. 7A, the head may have two ejection portions (101Bk1, 101BK2) for discharging black ink and an ejection portion 101S for discharging the treating liquid located therebetween. In this case, application is carried out in an order of black ink, the treating liquid and then black ink.

The head configuration shown in FIGS. 6 and 7A is an integrated type structure comprised of head units for inks and treating liquid. Each head unit has ejection orifices and a liquid chamber communicating thereto, and these units are separated each other. Therefore, each ejection portion corresponds to a head for an ink or a treating liquid.

FIG. 7B shows an example head having two black ink ejection portions as the example shown in FIG. 7A, but the ejection portions 101Bk1, 101Bk2 are arranged so as to discharge the ink before the treating liquid. According to this configuration, the treating liquid is applied after two drops of black ink were applied.

FIG. 7C shows a head configuration where the arrangement and number of 101Bk and 101S are the same as the example shown In FIG. 6, but the configuration of ejection portions for inks C, M and Y is different. For each ink, two ejection portions are provided. Ejection portions 101C1, 101M1, and 101Y1, and 101C2, 101M2 and 101Y2 are arranged in two columns in this order along a direction perpendicular to the scanning direction. In this head configuration, ink C, M or Y is superposed by plural scanning operations interposed by paper conveyance. Two ejection portions for each ink may eject thick and thin inks respectively.

As shown in FIGS. 7A and 7E, in the case where there are plural, for example two, black ink ejection portions, the first and second pigment ratio is the same for the inks discharged from the two ejection portions. but it may be changed. For example, the first and second pigment ratio may be 1:1 in the ejection portion 101Bk1 and 9:1 in the ejection portion 101Bk2. On the contrary, the ratio of the first and second pigments may be 9:1 in the ejection portion 101Bk1 and 1:1 in the ejection portion 101Bk2.

Example 3

In this Example, the print heads or the ejection portions are arranged as shown in FIG. 7A. Specifically, in FIG. 7A, the ejection portions 101Bk1 and 101Bk2 discharge black ink and the ejection portion 101S ejects the treating liquid. More specifically, ejection is carried out in the order of ink, treating liquid and ink.

In this example, the ejection orifices are arranged in each ejection portion at a density of 600 dpi, the ejection amount from each orifice is about 15 pl, and the space between each ejection portion is the same ½ inch as in Example 2. A discharge frequency is 10 kHz, and print resolution is 600 dpi in both of sub-scanning and scanning directions. This makes the ejection interval between the ink and treating liquid 30 m/sec. The treating liquid contains 2% Acetylenol EH for high penetrability.

According to this Example, the OD value of black letter print is as high as about 1.5, and "haze" or feathering can be prevented due to little fluidization of the reaction product by the treating liquid. Use of the treating liquid of high permeability, as described above, enables higher fixability.

Example 4

Figure 11:
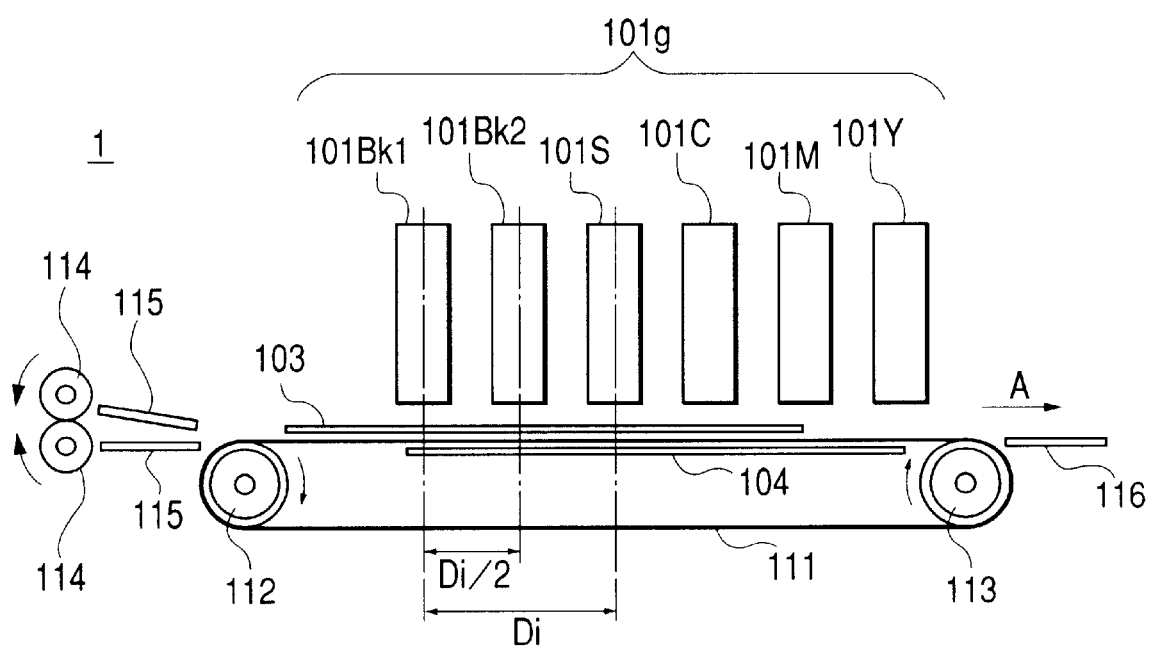
FIG. 11 is a side view of a printing apparatus in accordance with another embodiment of the present invention, showing the rough configuration thereof.

The printing system shown in FIG. 5 is modified to eject a first pigment ink and a second pigment ink respectively, instead of ejecting an ink containing the first and second pigments. As shown in FIG. 11, the recording head group 101g comprises the head 101Bk1 for a first pigment black ink, and the head 101Bk2 for a second pigment black ink, the head 101S for the treating liquid, color heads (cyan head 101c, magenta head 101M and yellow head 101Y) are arranged along the conveying direction A of the recording paper 103. Then, each print head discharges the ink of each color and the treating liquid to print black letters and color images.

In this Example, the first and the second black pigment inks discharged from the heads 101Bk1 and 101Bk2 respectively are of the less-penetrating ink having a low penetrating speed, and the treating liquid and the cyan, magenta and yellow inks discharged from the heads 101S, 101C, 101M and 101Y respectively are highly penetrating inks having a high penetrating speed.

The composition of the first and second inks and the treating liquid used in this example is as follows.

TABLE 9

(Treating liquid)

| | |
|---|---|
| Glycerol | 7 parts |
| Diethylene glycol | 5 parts |
| Acetylenol EH | 2 parts |
| Magnesium nitrate | 2 parts |
| Water | Balance |

TABLE 10

(First pigment ink of Black (Bk))

| | |
|---|---|
| Pigment dispersion 1 | 50 parts |
| Glycerol | 6 parts |
| Diethylene glycol | 5 parts |
| Acetylenol EH | 0.1 part |
| Water | Balance |

TABLE 11

(Second pigment ink of Black (Bk))

| | |
|---|---|
| Pigment dispersion 2 | 50 parts |
| Glycerol | 5 parts |
| Diethylene glycol | 8 parts |
| Isopropyl alcohol | 4 parts |
| Water | Balance |

Ka values of both of the first and second black pigment inks were 0.33 (ml/m$^2$·msec$^{1/2}$). The pigment dispersions 1 and 2 were the ones described in the above Example 1-1.

In this Example, by using the first and second pigment inks shown above, the first and second pigments both having the same polarity and the polymer dispersant are mixed and dispersed uniformly, to which the treating liquid containing a compound of the opposite polarity is mixed to react.

In this Example, a distance Di (see FIG. 11) between the head 101Bk2 for the pigment ink and the head 101S for the treating liquid is 80 mm, and the time interval between the second black pigment ink ejection and the treating liquid ejection is thus about 0.48 sec. The discharge amount of each print head is 15 pl per discharge except that the discharge amount of each Bk head is about 10 pl per discharge. Therefore, when one pixel is formed by the Bk1 and Bk2 heads, about 20 pl in total of Bk ink is applied to the pixel.

Printed articled obtained by such an apparatus and inks were evaluated in the same manner as in Examples 1-1 to 1-3, and substantially the same result was obtained.

Example 5

Figure 8:
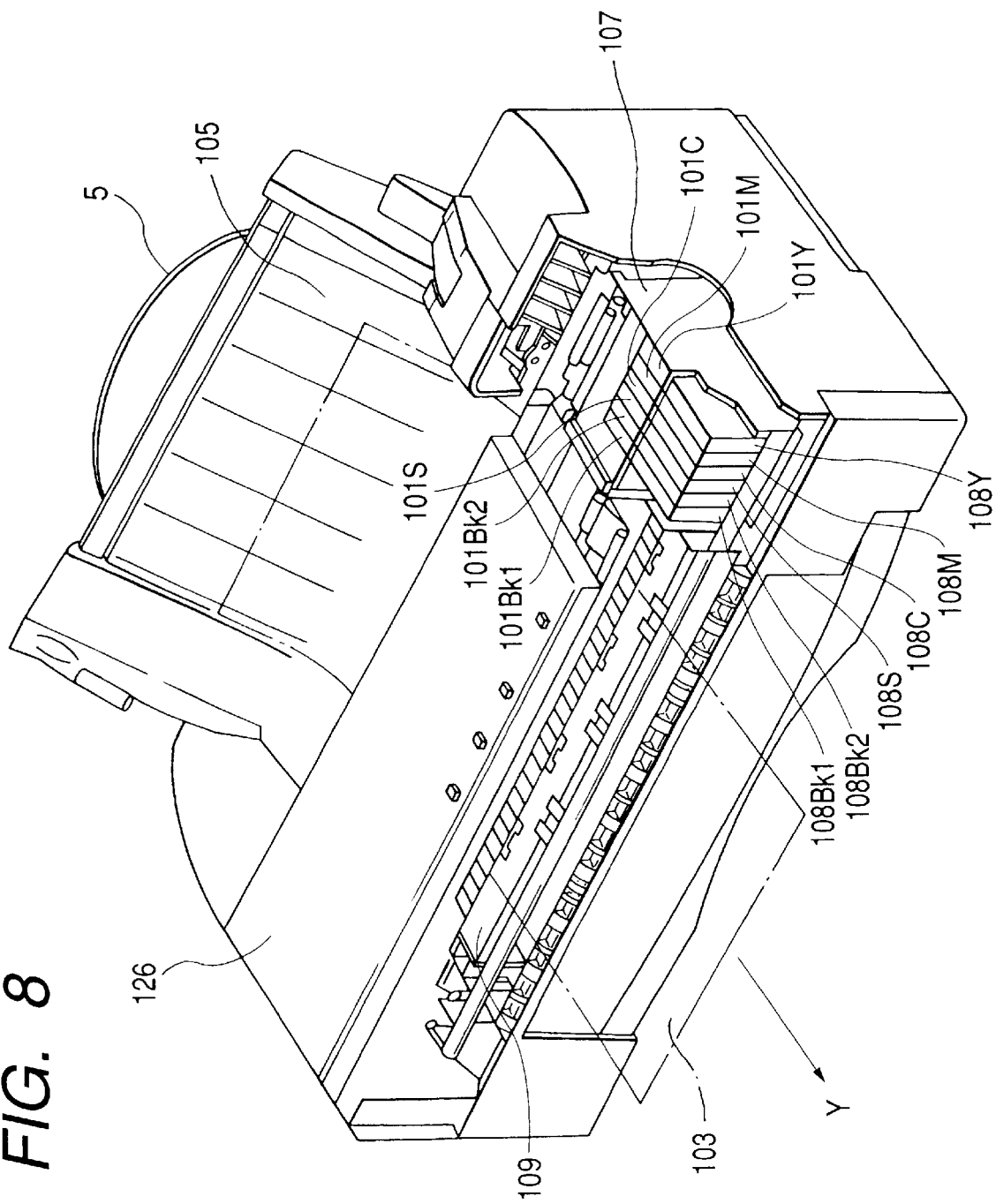
FIG. 8 is a perspective view of a printing apparatus in accordance with another embodiment of the present invention.

FIG. 8 is a schematic perspective view illustrating a construction of a serial type printing apparatus to be used in the present invention. It is apparent that not only the full line-type printing apparatus but a serial type printing apparatus can be used for such a process. In FIG. 8, the elements equal to those shown in FIG. 5 are denoted by the same reference numeral as in FIG. 5 and their detailed descriptions are omitted.

The recording paper 103 which is the printing medium is inserted from the sheet feeding portion 105 and discharged through a printing portion 126. In this example, used as the recording paper 103 is inexpensive plain paper which is widely used. In the printing portion 126, a carriage 107 is provided with print heads 101Bk1, 101Bk2, 101S, 101C, 101M, 101Y and is configured to be reciprocally movable along a guide rail 109 by a driving force of a motor (not shown). The print head 101Bk1 discharges the first black pigment ink and the print head 101Bk2 discharges the second black pigment ink 2, the heads 101S, 101C, 101M, 101Y respectively discharge the treating liquid, cyan ink, magenta ink and yellow ink, and they are driven to discharge the inks and treating liquid on the recording paper 103 in this order.

Each head is fed with an ink or a treating liquid from each corresponding tank 108Bk1, 108Bk2, 108S 108C, 108M or 108Y. When the ink is to be ejected, each electrical heat transducer (heater) provided for each ejection port of each head is fed with a driving signal, so as to apply heat energy to the ink or the treating liquid to allow it to generate bubbles. With the aid of the pressure of these bubbles, the ink or the treating liquid is ejected from its head. Each head includes 64 ejection ports at a density of 360 dpi which are arranged in almost the same direction Y of the conveyance of the recording paper 103, in other words, in the direction almost perpendicular to the scanning direction of each head. The ejection amount of ejection ports for the Bk ink is 15 pl and the ejection amount of ejection ports for the treating liquid and the ink other than the Bk ink is 23 pl.

In the above configuration, a distance between the heads is ½ inch, therefore, a distance between the heads 101Bk1 and 101S is ½ inch. Since a printing density in a scanning direction is 720 dpi and a discharge frequency of each head is 7.2 kHz, time after the discharge of pigment ink from the head 101Bk1 till the discharge of the treating liquid from the head 101S is 0.1 sec.

Example 6

Another example of the present invention is a modified serial type ink jet printing apparatus shown in FIG. 8, wherein arrangement order of the print heads is modified and, in compliance with this, application order of the first and second black pigment inks and the treating liquid is modified.

More specifically, the arrangement of the print heads in FIG. 8 was modified to be in the order of the heads 101Bk1, 105S, 101Bk2 (the rest of the heads are the same as in Example 5), and consequently, the discharge order on the printing medium is: the first black pigment ink, the treating liquid and the second black pigment ink. The distance between the heads and the discharge frequency of each head are the same as in Example 2.

According to this example, fluidization of reacted ink and treating liquid is suppressed in comparison with the case where the treating liquid is applied after the first and second pigment inks, further suppressing haze phenomenon.

In the above description, the first black pigment ink is discharged from the head 101Bk1 and the second black pigment ink is discharged from the head 101Bk2. On the contrary, the second pigment ink may be discharged from the head 101Bk1 and the second pigment ink may be discharged from the head 101Bk2. The same effect as the above can be obtained by this configuration.

Example 7

Figure 9:
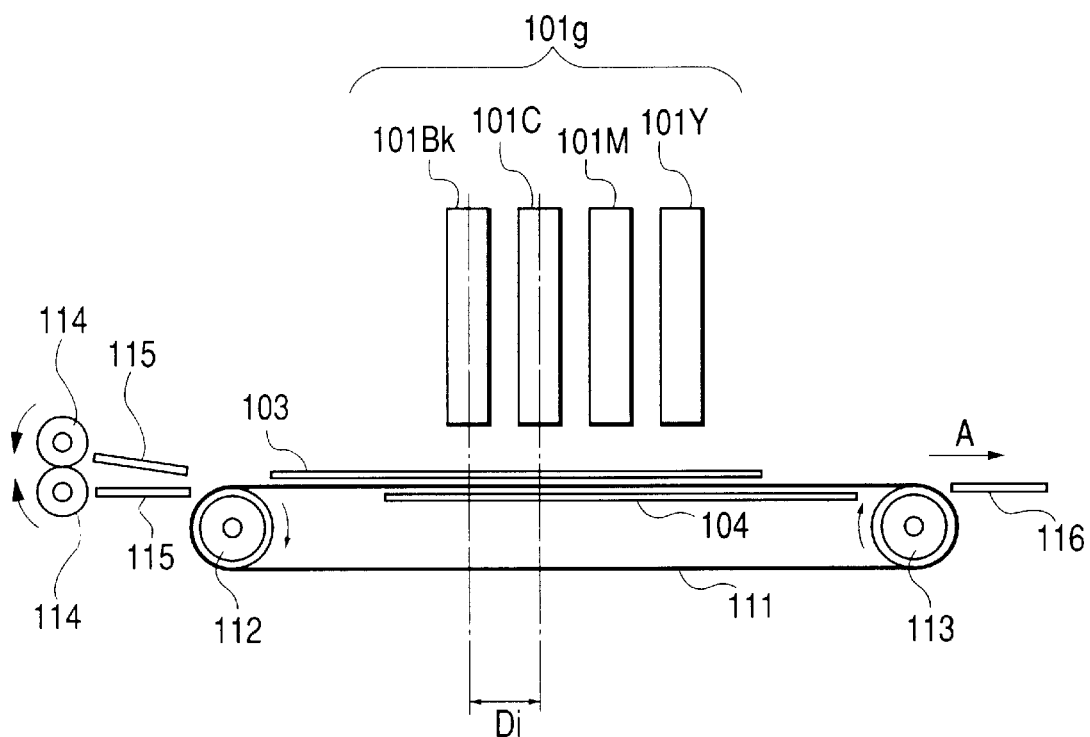
FIG. 9 is a side view of a printing apparatus in accordance with still another embodiment of the present invention, showing the rough configuration thereof.

FIG. 9 is a side view of a schematic configuration of another full-line type printing apparatus according to the present invention. The same component parts as shown in FIG. 5 are represented by the same reference numerals without detailed descriptions thereof.

The recording head group 101g comprises the head 101Bk for the black pigment ink described above, the color heads (cyan head 101c, magenta head 101M and yellow head 101Y) are arranged along the conveying direction A of the recording paper 103. The color inks, cyan, magenta and yellow, each contains the treating liquid composition. Then, each print head discharges the ink of each color to print black letters and color images.

In this Example, the black pigment ink discharged from the head 101Bk was of the less-penetrating ink having a low penetrating speed, and the cyan, magenta and yellow inks discharged from the heads 101C, 101M and 101Y respectively are highly penetrating inks having a high penetrating speed.

The composition of the inks used in this example is as follows. A ratio of each component is represented in parts.

TABLE 12

(Yellow (Y) ink)

| | |
|---|---|
| C.I. Acid Yellow 23 | 3 parts |
| Glycerol | 7 parts |
| Diethylene glycol | 5 parts |
| Calcium nitrate | 2 parts |
| Acetylenol EH | 1 part |
| Water | Balance |

TABLE 13

(Magenta (M) ink)

| | |
|---|---|
| Dye of structural formula below | 3 parts |
| Glycerol | 7 parts |
| Diethylene glycol | 5 parts |
| Magnesium nitrate | 2 parts |
| Acetylenol EH | 1 part |
| Water | Balance |

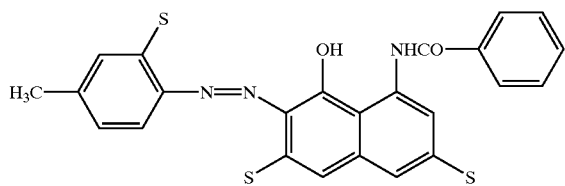

wherein S=SO$_3$Na.

TABLE 14

(Cyan (C) ink)

| | |
|---|---|
| C.I. Direct Blue 199 | 2 parts |
| C.I. Acid Blue 9 | 1 part |
| Glycerol | 7 parts |
| Diethylene glycol | 5 parts |
| Magnesium nitrate | 2 parts |
| Acetylenol EH | 1 part |
| Water | Balance |

TABLE 15

(Black (Bk) ink)

| | |
|---|---|
| Pigment dispersion 1 | 25 parts |
| Pigment dispersion 2 | 25 parts |

TABLE 15-continued (Black (Bk) ink)

| | |
|---|---|
| Glycerol | 6 parts |
| Diethylene glycol | 5 parts |
| Magnesium nitrate | 2 parts |
| Acetylenol EH | 0.1 part |
| Water | Balance |

Ka value of this black ink was 0.33 (ml/m$^2$·msec$^{1/2}$). The pigment dispersions 1 and 2 were those described in the above Example 1-1.

The ejection amount from each print head was about 15 pl (picoliter) per discharge. For a pixel of such as a black letter, the black ink was applied first, and the color inks were applied later. The application amount of each color ink was 8% of the black ink. Specifically, the cyan ink, the magenta ink and the yellow ink, respectively were 8% of the black ink. That is, the sum of three inks of cyan, magenta and yellow was 24% to 100% of the black ink.

The same result as in Example 1-3 was obtained with respect to the OD which shows printing grade of black, feathering, edge sharpness, time for water fastness development and fixability in this Example.

Example 8

Figure 10:
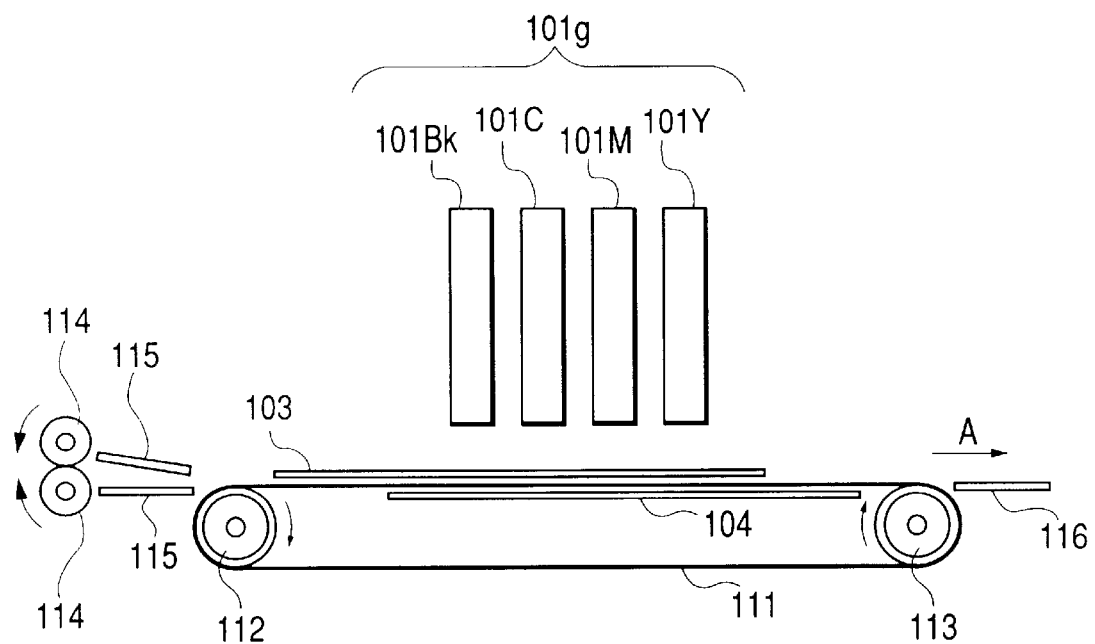
FIG. 10 is a side view of a printing apparatus in accordance with still another embodiment of the present invention, showing the rough configuration thereof.

FIG. 10 is a side view of a schematic configuration of another full-line type printing apparatus according to the present invention. The same component parts as shown in FIG. 5 are represented by the same reference numerals without detailed descriptions thereof.

The recording head group 101g comprises the head 101Bk for the black pigment ink described above, the color heads (cyan head 101c, magenta head 101M and yellow head 101Y) are arranged along the conveying direction A of the recording paper 103. The cyan color head 101C ejects cyan color ink having the treating liquid composition. Then, each print head discharges the ink of each color to print black letters and color images.

In this Example, the black pigment ink discharged from the head 101Bk was of the less-penetrating ink having a low penetrating speed, and the other color inks are highly penetrating inks having a high penetrating speed.

The composition of the inks used in this example is as follows. The ratio of each composition is shown with parts by weight.

TABLE 16

(Yellow (Y) ink)

| | |
|---|---|
| C.I. Acid. Yellow 23 | 3 parts |
| Glycerol | 7 parts |
| Diethylene glycol | 5 parts |
| Acetylenol EH | 1 part |
| Water | Balance |

TABLE 17

(Magenta (M) ink)

| | |
|---|---|
| Dye of structural formula shown below | 3 parts |
| Glycerol | 7 parts |
| Diethylene glycol | 5 parts |

TABLE 17-continued (Magenta (M) ink)

| Acetylenol EH | 1 part |
|---|---|
| Water | Balance |

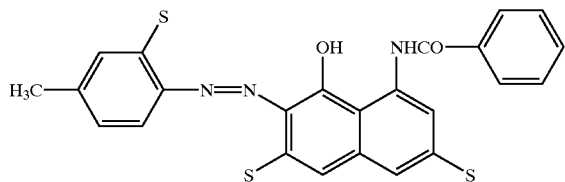

wherein S =SO$_3$Na.

TABLE 18

(Cyan (C) ink)

| C.I. Direct Blue 199 | 2 parts |
|---|---|
| C.I. Acid Blue 9 | 1 part |
| Glycerol | 7 parts |
| Diethylene glycol | 5 parts |
| Magnesium nitrate | 2 parts |
| Acetylenol EH | 1 part |
| Water | Balance |

TABLE 19

(Black (Bk) ink)

| Pigment dispersion 1 | 25 parts |
|---|---|
| Pigment dispersion 2 | 25 parts |
| Glycerol | 6 parts |
| Diethylene glycol | 5 parts |
| Acetylenal EH | 0.1 part |
| Water | Balance |

Ka value of this black ink was 0.33 (ml/m$^2$·msec$^{1/2}$). The pigment dispersions 1 and 2 were those described in the above Example 1-1.

Each print head ejected ink about 15 pl (picoliter) per discharge. Black pixels of a black image such as a black letter are formed by applying black ink first and then the cyan ink as a treating liquid. Application of the cyan ink is enough for this purpose, but magenta and yellow inks are also applied for better color tone and fixation. The application amount of each color ink was 8% of the black ink. Specifically, the cyan ink, the magenta ink and the yellow ink, respectively were 8% of the black ink. That is, the sum of three inks of cyan, magenta and yellow was 24% to 100% of the black ink.

The same result as in Example 1-3 was obtained with respect to the OD which shows printing grade of black, feathering, edge sharpness, water fastness occurring time and fixability in this example.

When the printing order of the color inks are modified other than the order of cyan, magenta and yellow described above, a multivalent metal salt or polyvalent metal ion to the ink which is applied next to the black ink. In this case, the multivalent metal salt or ion is not necessarily added to the second or third color ink.

According to the present invention, an ink containing a first pigment and a second pigment and a polymer dispersant to disperse the second pigment is applied to the printing medium and then a treating liquid containing a multivalent metal ion or salt reactive with the ink is applied to be mixed with the ink in a liquid state on the printing medium. This can provide images of high OD, high edge sharpness, and less back-through. In addition, the slow and insufficient fixing, a defect of conventional pigment inks, can be improved to a great extent.

Further, by using an ink of low penetrating speed, the coloring material remains on the surface of the printing medium in a large amount to increase OD, even when the treating liquid is applied thereon after a certain time period long enough for ink diffusion. In addition, use of a slow penetration ink, per se, can suppress so-called feathering.

According to the present invention, occurrence of "oozing" or "haze" around image dots can be effectively suppressed.

When the ink, the treating liquid, and then the ink are applied in this order, further improvement in OD, haze or feathering suppression. By using a highly penetrating treating liquid, good fixation can be obtained.

By using a treating liquid having a Ka value by the Bristow method of 5.0 (ml/m$^2$·msec$^{1/2}$), because of the relatively high penetrability, the fixing speed is improved.

When the applying order is the first ink, the second ink and the treating liquid, the "back-through" phenomenon can be suppressed.

When the treating liquid is applied after one of the first ink and the second ink, and then the remaining ink is applied, the first pigment, the second pigment and the treating liquid are mixed on the printing medium, which can alleviate "oozing" phenomenon around the image dot. As a result, high quality printing with high OD and excellent edge sharpness can be obtained. By using a treating liquid of relatively high penetrability, the reactant between the inks and the treating liquid also acquires high penetrability to increase the penetrating speed as a whole. Consequently, the fixing speed can be increased for realization of high-speed printing.

What is claimed is:

1. An ink jet printing apparatus comprising:
   a container containing an ink containing an aqueous medium, a first pigment, a second pigment and a polymer dispersant, the first pigment being a self-dispersing pigment having at least one anionic group bound to the surface thereof directly or via another atomic group, the second pigment being a pigment which can be dispersed in the water-based medium with the polymer dispersant, the polymer dispersant comprising at least one of a nonionic polymer and an anionic polymer;
   a container containing a treating liquid that aggregates at least one of the pigments contained in the ink when the treating liquid and the ink are mixed on the printing medium in a liquid state, the treating liquid containing at least one of a multivalent metal cation and a salt thereof,
   an ink ejection portion for ejecting the ink;
   a treating liquid ejection portion for ejecting the treating liquid;
   and control means for controlling said ink ejection portion and said treating liquid ejection portion so as to eject the ink and the treating liquid, in this order, onto the printing medium so that the ink and the treating liquid are provided onto the printing medium from respective ejection portions and mixed with each other in a liquid state on the printing medium.

2. An ink jet printing apparatus comprising:
   a container containing an ink containing an aqueous medium, a first pigment, a second pigment and a polymer dispersant, the first pigment being a self-dispersing pigment having at least one anionic group bound to the surface thereof directly or via another atomic group, the second pigment being a pigment which can be dispersed in the aqueous medium with the polymer dispersant, the polymer dispersant comprising at least one of a nonionic polymer and an anionic polymer;

a container containing a treating liquid that aggregates at least one of the pigments contained in the ink when the treating liquid and the ink are mixed on the printing medium in a liquid state, the treating liquid containing at least one of a multivalent metal cation and a salt thereof, an ink ejection portion for ejecting the ink;

a treating liquid ejection portion for ejecting the treating liquid;

and control means for controlling said ink ejection portion and said treating liquid ejection portion so that the ink, the treating liquid and the ink are ejected, in this order, onto the printing medium from respective ejection portions and mixed with each other in a liquid state on the printing medium, and said control means controls the ink ejection portion to mix the ink into the liquid mixture of the ink and the treating liquid.

3. An ink jet printing apparatus comprising:

a container containing an ink containing an aqueous medium, a first pigment, a second pigment and a polymer dispersant, the first pigment being a self-dispersing pigment having at least one anionic group bound to the surface thereof directly or via another atomic group, the second pigment being a pigment which can be dispersed in the aqueous medium with the polymer dispersant, the polymer dispersant comprising at least one of a nonionic polymer and an anionic polymer;

a container containing a treating liquid that aggregates at least one of the pigments contained in the ink when the treating liquid and the ink are mixed on the printing medium in a liquid state, the treating liquid containing at least one of a multivalent metal cation and a salt thereof, an ink ejection portion for ejecting the ink;

a treating liquid ejection portion for ejecting the treating liquid;

and control means for ejecting the ink and the treating liquid, in this order, onto the printing medium, the control means comprising:

an arrangement means for arranging said pigment ink ejection portion and said treating liquid ejection portion in a predetermined position; and ejection control means for controlling relative position of each said ejection portion and controlling said ejection portions so as to eject the ink and the treating liquid from respective ejection portions and mix them with each other on the printing medium, wherein said ink ejection portion includes at least one pigment ink ejection portion for discharging the ink.

4. The ink jet printing apparatus according to any one of claims 1 to 3, wherein the anionic group is selected from the group consisting of:

—COOM, —SO$_3$M, —PO$_3$HM and —PO$_3$M$_2$ wherein M is independently hydrogen, alkaline metal, ammonium or organic ammonium.

5. The ink jet printing apparatus according to any one of claims 1 to 3, wherein the other atomic group is selected from the group consisting of an alkylene group of 1 to 12 carbon atoms, a substituted or unsubstituted phenylene group, and a substituted or unsubstituted naphthylene group.

6. The ink jet printing apparatus according to any one of claims 1 to 3, wherein 80% or more of particles of the first pigment have a diameter of 0.05 to 0.3 µm.

7. The ink jet printing apparatus according to claim 6, wherein 80% or more of the particles of the first pigment have a diameter of 0.1 to 0.25 µm.

8. The ink jet printing apparatus according to any one of claims 1 to 3, wherein the second pigment is dispersed with a polymer dispersant adsorbed on the surface of the second pigment.

9. The ink jet printing apparatus according to any one of claims 1 to 3, wherein the polymer dispersant is either a sulfonic acid polymer dispersant or a carboxylic acid polymer dispersant.

10. The ink jet printing apparatus according to any one of claims 1 to 3, wherein the second pigment comprises at least two pigments having structures different from each other.

11. The ink jet printing apparatus according to any one of claims 1 to 3, wherein the weight ratio of the first pigment to the second pigment is in the range of 5/95 to 97/3.

12. The ink jet printing apparatus according to claim 11, wherein the weight ratio of the first pigment to the second pigment is in the range of 10/90 to 95/5.

13. The ink jet printing apparatus according to claim 12, wherein the weight ratio of the first pigment to the second pigment is in the range of 4/6 to 9/1.

14. The ink jet printing apparatus according to any one of claims 1 to 3, wherein the amount of the first pigment contained in the ink is larger than that of the second pigment.

15. The ink jet printing apparatus according to any one of claims 1 to 3, wherein at least one of the first pigment and the second pigment is carbon black.

16. The ink jet printing apparatus according to any one of claims 1 to 3, wherein the ink further contains a dye having the same polarity as that of the group attached on the surface of the first pigment.

17. The ink jet printing apparatus according to claim 16, wherein the dye is an anionic dye.

18. The ink jet printing apparatus according to claim 17, wherein the anionic dye is selected from the group consisting of acid dyes, direct dyes and reactive dyes.

19. The ink jet printing apparatus according to claim 18, wherein the anionic dye has a disazo skeleton or a trisazo skeleton.

20. The ink jet printing apparatus according to any one of claims 1 to 3, wherein the ink is a black ink.

21. The ink jet printing apparatus according to claim 3, wherein said arrangement means arranges said pigment ink ejection portion and said treating liquid ejection portion, in this order, in a given direction and said ejection control means controls each of said ejection portions so that the ink and the treating liquid are ejected onto the printing medium in this order, to be mixed with each other thereon.

22. The ink jet printing apparatus according to claim 3, wherein said arrangement means arranges said pigment ink ejection portion, said treating liquid ejection portion and said pigment ink ejection portion, in this order, in a given direction and said ejection control means controls each of said ejection portions so that the ink, the treating liquid and the ink are ejected onto the printing medium in this order, to be mixed with each other thereon.

23. The ink jet printing apparatus according to claim 3, wherein said arrangement means further arranges a cyan ink ejection portion for discharging a cyan ink, a magenta ink ejection portion for discharging a magenta ink and a yellow ink discharging portion for discharging a yellow ink subsequent to said pigment ink ejection portion and said treating liquid ejection portion.

24. The ink jet printing apparatus according to any one of claims 1 to 3, wherein the treating liquid has a penetrating rate equal to or higher than a Ka value of 5.0 (ml/m$^2$·m sec$^{1/2}$) determined by the Bristow's method.

25. The ink jet printing apparatus according to claim 3, wherein said pigment ink ejection portion and said treating liquid ejection portion have ink ejection orifices and treating liquid ejection orifices respectively, the orifices being arranged to cover a printing width of the printing medium, and wherein the printing medium moves in relation to said ink ejection portion and said treating liquid ejection portion.

26. The ink jet printing apparatus according to claim 3, further comprising driving means for moving said pigment ink ejection portion and said treating liquid ejection portion relative to the printing medium while keeping both of said ejection portions in position arranged by said arrangement means, wherein said ejection control means scans each of said ejection portions and allows the same to move relative to the printing medium by controlling the driving means.

27. The ink jet printing apparatus according to claim 3, wherein said pigment ink ejection portion and said treating liquid ejection portion eject the ink and the treating liquid, respectively, using the pressure of bubbles created in the ink and the treating liquid by applying thermal energy thereto.

28. The ink jet printing apparatus according to claim 24, wherein the ink has a penetrating rate of a Ka value, determined by Bristow's method, of less than 1.0 (ml/m$^2$·m sec$^{1/2}$).

29. An ink jet printing apparatus comprising:
a container containing an ink containing an aqueous medium, a first pigment, a second pigment and a polymer dispersant, the first pigment being a self-dispersing pigment having at least one ionic group bound to the surface thereof directly or via another atomic group, the second pigment being a pigment which can be dispersed in the aqueous medium by the use of the polymer dispersant, the polymer dispersant comprising at least one of a nonionic polymer and a polymer with the same polarity as that of the group bound to the surface of the first pigment;
a container containing a treating liquid containing at least one multivalent metal cation selected from the group consisting of Ca$^{++}$, Cu$^{++}$, Ni$^{++}$, Mg$^{++}$, Zn$^{+++}$, Ba$^{++}$, Al$^{+++}$, Fe$^{+++}$, Cr$^{+++}$, Co$^{++}$, Fe$^{++}$, La$^{++}$, Nd$^{+++}$, and Y$^{+++}$ or a salt thereof, or both the multivalent metal cation and the salt thereof;
an ink ejection portion for ejecting the ink;
a treating liquid ejection portion for ejecting the treating liquid;
and control means for controlling said ink ejection portion and said treating liquid ejection portion so as to eject the ink and the treating liquid, in this order, onto the printing medium so that the ink and the treating liquid are ejected onto the printing medium from respective ejection portions and mixed with each other in a liquid state on the printing medium.

30. An ink jet printing apparatus comprising:
a container containing a first ink;
a container containing a second ink;
a container containing a treating liquid,
the first ink containing a self-dispersing pigment in an aqueous medium, the self-dispersing pigment having at least one anionic group attached on the surface thereof directly or via another atomic group, the second ink containing a pigment and a polymer dispersant, the pigment being dispersed in an aqueous medium by the use of the polymer dispersant, the polymer dispersant comprising at least one of a nonionic polymer and an anionic polymer,
the treating liquid containing at least one of a multivalent metal cation and a salt thereof, that aggregates at least one of the pigments in the inks when the treating liquid and either of the inks are mixed on the printing medium in a liquid state;
an ink ejection portion for ejecting the first and second inks;
a treating liquid ejection portion for ejecting the treating liquid,; and
control means for controlling said ink ejection portion and said treating liquid ejection portion so as to eject the ink and the treating liquid, in this order, onto the printing medium from respective ejection portions and mixed with each other in a liquid state on the printing medium,
wherein said control means controls the ejection of the inks and the treating liquid so that either of the inks is applied onto the printing medium prior to the application of the treating liquid.

31. An ink jet printing method for forming an image on a printing medium comprising the steps of:
(i) applying an ink on a printing medium by ink jet method; and
(ii) applying a treating liquid reactive with the ink on the printing medium,
wherein the ink contains a water-based medium, a first pigment, a second pigment and a polymer dispersant, the first pigment being a self-dispersing pigment having at least one anionic group bound to the surface thereof directly or via another atomic group, the second pigment being a pigment which can be dispersed in the aqueous medium with the polymer dispersant, the polymer dispersant comprising at least one of a nonionic polymer and an anionic polymer,
wherein the treating liquid contains at least one of a multivalent metal cation and a salt thereof, that aggregates at least either of the pigments contained in the ink when the treating liquid and the ink are mixed on the printing medium in the liquid state, and
wherein step (ii) is carried out after step (i) or at substantially the same time, so that the ink and the treating liquid come into contact in a liquid state on the printing medium.

32. The ink jet printing method according to claim 31, further comprising a step (iii) of providing the ink onto the printing medium after steps (i) and (ii), so that the ink is mixed with the liquid mixture of the ink and the treating liquid formed by steps (i) and (ii).

33. The ink jet printing method according to claim 31, wherein the treating liquid has a penetrating rate equal to or higher than a Ka value of 5.0 (ml/m$^2$·m sec$^{1/2}$) determined by Bristow's method.

34. The ink jet printing method according to claim 31, wherein the ink has a penetrating rate smaller than a Ka value of 1.0 (ml/m$^2$·m sec$^{1/2}$) determined by Bristow's method.

35. The ink jet printing method according to claim 31, wherein the anionic group is selected from the group consisting of:

—COOM, —SO$_3$M, —PO$_3$HM and —PO$_3$M$_2$ wherein M is independently hydrogen, alkaline metal, ammonium or organic ammonium.

36. The ink jet printing method according to claim 31, wherein the other atomic group is selected from the group consisting of an alkylene group of 1 to 12 carbon atoms, a substituted or unsubstituted napthylene group.

37. The ink jet printing method according to claim 31, wherein 80% or more of particles of the first pigment are 0.05 to 0.3 µm in diameter.

38. The ink jet printing method according to claim 31, wherein 80% or more of the particles of the first pigment have a diameter of 0.1 to 0.25 µm.

39. The ink jet printing method according to claim 31, wherein the second pigment is dispersed with a polymer dispersant adsorbed on the surface of the second pigment.

40. The ink jet printing method according to claim 31, wherein the polymer dispersant is either a sulfonic polymer dispersant or a carboxylic polymer dispersant.

41. The ink jet printing method according to claim 31, wherein the second pigment comprises at least two pigments whose structures are different from each other.

42. The ink jet printing method according to claim 31, wherein the weight ratio of the first pigment to the second pigment is in the range of 5/95 to 97/3.

43. The ink jet printing method according to claim 42, wherein the weight ratio of the first pigment to the second pigment is in the range of 10/90 to 95/5.

44. The ink jet printing method according to claim 43, wherein the weight ratio of the first pigment to the second pigment is in the range of 4/6 to 9/1.

45. The ink jet printing method according to claim 31, wherein the amount of the first pigment contained in the ink is larger than that of the second pigment.

46. The ink jet printing method according to claim 31, wherein at least one of the first pigment and the second pigment is carbon black.

47. The ink jet printing method according to claim 31, wherein the ink further contains a dye having the same polarity as that of the group bound to the surface of the first pigment.

48. The ink jet printing method according to claim 47, wherein the dye is an anionic dye.

49. The ink jet printing method according to claim 48, wherein the anionic dye is selected from the group consisting of acid dyes, direct dyes and reactive dyes.

50. The ink jet printing method according to claim 48, wherein the anionic dye has a disazo skeleton or a trisazo skeleton.

51. An ink jet printing method comprising the steps of:

(i) providing a first ink, a second ink and a treating liquid, the first ink containing a self-dispersing pigment in an aqueous medium, the self-dispersing pigment being a self-dispersing pigment having at least one anionic group bound to the surface thereof directly or via another atomic group, the second ink containing a second pigment and a polymer dispersant, the second pigment being a pigment which can be dispersed in the water-based medium with the polymer dispersant, the polymer dispersant comprising at least one of a nonionic polymer and an anionic polymer, and the treating liquid containing at least one of a multivalent metal cation and a salt thereof, that aggregates at least either of the pigments contained in the inks when the treating liquid and either of the inks are mixed on the printing medium in a liquid state;

(ii) applying the first ink onto a recording medium;

(iii) applying the second ink onto the recording medium; and (iv) applying the treating liquid onto the recording medium, the steps (ii), (iii) and (iv) being performed in such a manner that the inks and the treating liquid come into contact with each other in a liquid state on the recording medium, wherein either of the steps (ii) and (iii) is performed prior to the step (iv).

52. The ink jet printing method according to claim 51, wherein the treating liquid is provided onto the printing medium after the first and second inks.

53. The ink jet printing method according to claim 51, wherein the treating liquid is applied to the printing medium after either of the first ink and the second ink was applied onto the printing medium, but prior to application of the other ink.

* * * * *

UNITED STATES PATENT AND TRADEMARK OFFICE
CERTIFICATE OF CORRECTION

PATENT NO. : 6,557,991 B2
DATED : May 6, 2003
INVENTOR(S) : Noribumi Koitabashi et al.

It is certified that error appears in the above-identified patent and that said Letters Patent is hereby corrected as shown below:

Column 2,
Line 10, "are" should read -- is --.
Line 33, "mixed" should read -- mixed with --.

Column 3,
Line 32, "has" should read -- have --.
Line 61, "In" should read -- in --.

Column 11,
Line 25, "weight. The" should read -- weight. --.

Column 14,
Line 42, "180:" should read -- 180; --.
Line 48, "8:" should read -- 8; --.

Column 15,
Line 37, "the same the" should read -- the same as the amount of an --.

Column 16,
Line 2, "an" should read -- a --.

Column 18,
Line 33, "amount." should read -- amount, --.

Column 20,
Line 33, "added" should read -- added to --.

Column 21,
Line 2, "duration;" should read -- duration: --.
Lines 25 and 32, "int" should read -- in --.

Column 23,
Line 56, "separated" should read -- separated from --.
Line 66, "In" should read -- in --.

Column 24,
Line 10, "7E," should read -- 7B, --.
Line 13, "portions." should read -- portions, --.

UNITED STATES PATENT AND TRADEMARK OFFICE
CERTIFICATE OF CORRECTION

PATENT NO.   : 6,557,991 B2
DATED        : May 6, 2003
INVENTOR(S)  : Noribumi Koitabashi et al.

It is certified that error appears in the above-identified patent and that said Letters Patent is hereby corrected as shown below:

Column 34,
Line 16, "liquid,;" should read -- liquid; --.

Column 35,
Line 9, "atoms," should read -- atoms, a substituted or unsubstituted phenylene group, and --.

Signed and Sealed this

Twentieth Day of January, 2004

JON W. DUDAS
*Acting Director of the United States Patent and Trademark Office*